(12) United States Patent
Onuki et al.

(10) Patent No.: US 8,711,270 B2
(45) Date of Patent: Apr. 29, 2014

(54) FOCUS DETECTION DEVICE AND IMAGING APPARATUS HAVING THE SAME

(75) Inventors: Ichiro Onuki, Kawasaki (JP); Akihiko Nagano, Ichihara (JP); Makoto Takamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 12/921,466

(22) PCT Filed: Mar. 6, 2009

(86) PCT No.: PCT/JP2009/054818
§ 371 (c)(1),
(2), (4) Date: Sep. 8, 2010

(87) PCT Pub. No.: WO2009/113644
PCT Pub. Date: Sep. 17, 2009

(65) Prior Publication Data
US 2011/0025904 A1    Feb. 3, 2011

(30) Foreign Application Priority Data

Mar. 11, 2008  (JP) .................................. 2008-061845
Mar. 3, 2009  (JP) .................................. 2009-049716

(51) Int. Cl.
*H04N 5/232*  (2006.01)
*H04N 5/225*  (2006.01)

(52) U.S. Cl.
USPC .......................................... 348/345; 348/360

(58) Field of Classification Search
USPC ......... 348/270–280, 300, 301, 315, 316, 308, 348/340, 345–356; 396/113–114, 128, 121; 258/208.1
See application file for complete search history.

(56) References Cited

U.S. PATENT DOCUMENTS 4,460,260 A * 7/1984 Utagawa ...................... 396/113
6,597,868 B2   7/2003 Suda
6,829,008 B1 * 12/2004 Kondo et al. ................. 348/302

(Continued)

FOREIGN PATENT DOCUMENTS

EP    0981245 A    2/2000
EP    1653257 A    5/2006

(Continued)

OTHER PUBLICATIONS

Japanese Office Action issued on Nov. 6, 2012 in corresponding application No. 2009-038487.

(Continued)

*Primary Examiner* — Aung S Moe
(74) *Attorney, Agent, or Firm* — Carter, DeLuca, Farrell & Schmidt LLP

(57) ABSTRACT

A focus detection device having imaging pixels and focus-detecting pixels using a phase-difference focus detection method implements high-precision focus detection. In the focus detection device, a plurality of pixels each having a photoelectric conversion unit for converting an incident light flux into signal charges, and a microlens having a focus position near the photoelectric conversion unit are arranged. The plurality of pixels include a plurality of imaging pixels for generating a shot image, and a plurality of focus-detecting pixels for generating an image signal for focus detection by the phase-difference focus detection method. An opening for giving a pupil division function to the focus-detecting pixel is formed using electrodes arranged to read out signal charges from the photoelectric conversion unit.

20 Claims, 21 Drawing Sheets

(56) References Cited

U.S. PATENT DOCUMENTS

| | | | |
|---|---|---|---|
| 7,095,441 B2* | 8/2006 | Nagano | 348/308 |
| 7,745,772 B2* | 6/2010 | Utagawa | 250/208.1 |
| 8,098,322 B2* | 1/2012 | Katsuda et al. | 348/350 |
| 8,149,324 B2* | 4/2012 | Oikawa | 348/349 |
| 8,175,447 B2* | 5/2012 | Takaiwa | 396/48 |
| 8,218,017 B2* | 7/2012 | Matsuo et al. | 348/208.12 |
| 8,319,874 B2* | 11/2012 | Suzuki | 348/308 |
| 2001/0026322 A1 | 10/2001 | Takahashi et al. | |
| 2001/0036361 A1* | 11/2001 | Suda | 396/111 |
| 2002/0121652 A1* | 9/2002 | Yamasaki | 257/222 |
| 2005/0045975 A1* | 3/2005 | Kondo et al. | 257/414 |
| 2006/0125945 A1* | 6/2006 | Suzuki | 348/311 |
| 2007/0206940 A1* | 9/2007 | Kusaka | 396/128 |
| 2008/0259202 A1* | 10/2008 | Fujii | 348/345 |
| 2008/0291311 A1* | 11/2008 | Kusaka | 348/308 |
| 2008/0317454 A1* | 12/2008 | Onuki | 396/128 |
| 2009/0290059 A1* | 11/2009 | Suzuki | 348/308 |
| 2011/0025904 A1* | 2/2011 | Onuki et al. | 348/360 |
| 2011/0037888 A1* | 2/2011 | Onuki | 348/340 |
| 2011/0096211 A1* | 4/2011 | Oikawa et al. | 348/273 |
| 2011/0228145 A1* | 9/2011 | Kimura | 348/247 |

FOREIGN PATENT DOCUMENTS

| | | |
|---|---|---|
| JP | 08-106041 A | 4/1996 |
| JP | 11-211971 A | 8/1999 |
| JP | 2000-156823 A | 6/2000 |
| JP | 2001-305415 A | 10/2001 |
| JP | 2005-072364 A | 3/2005 |
| JP | 2007-155929 A | 6/2007 |
| JP | 2007-184716 A | 7/2007 |
| JP | 2008-015215 A | 1/2008 |
| JP | 2008-028105 A | 2/2008 |
| JP | 2008-134389 A | 6/2008 |
| JP | 2009-003122 A | 1/2009 |

OTHER PUBLICATIONS

Japanese Office Action issued on Feb. 4, 2013 in counterpart Japanese Application No. 2009-049716.

European Search Report issued on Mar. 5, 2014 in corresponding EP Application No. 09719908.7.

* cited by examiner

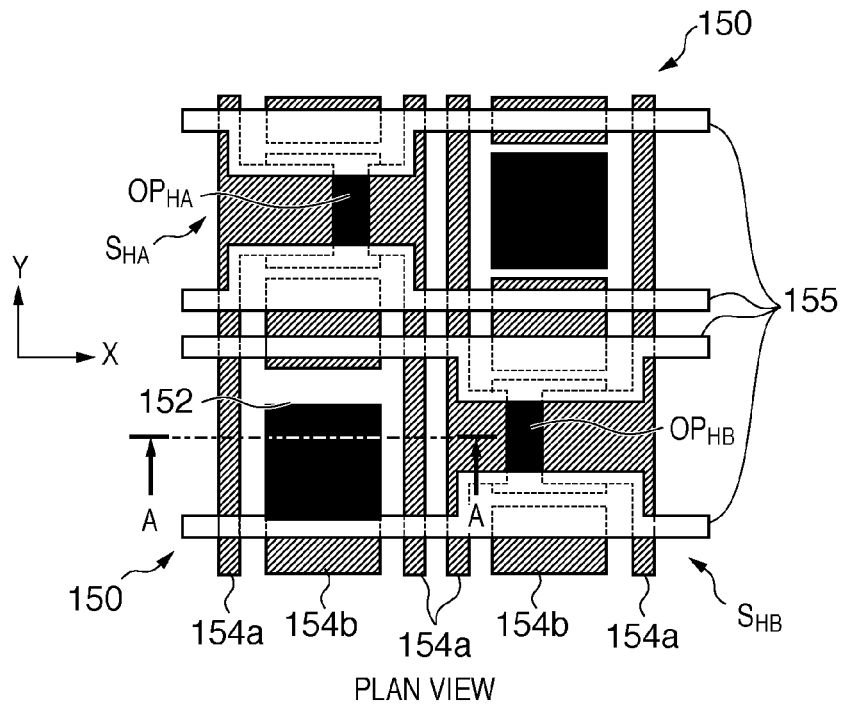
PLAN VIEW
F I G. 5A
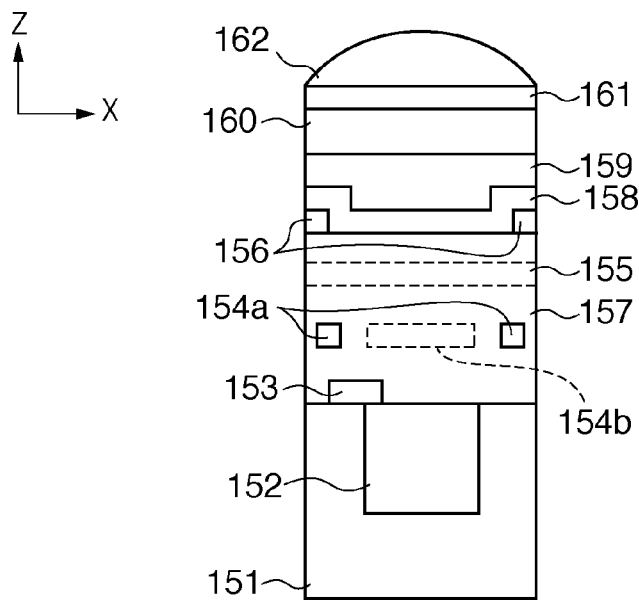
SECTIONAL VIEW ALONG A - A
F I G. 5B

PLAN VIEW

SECTIONAL VIEW ALONG A - A

PLAN VIEW

SECTIONAL VIEW ALONG A - A

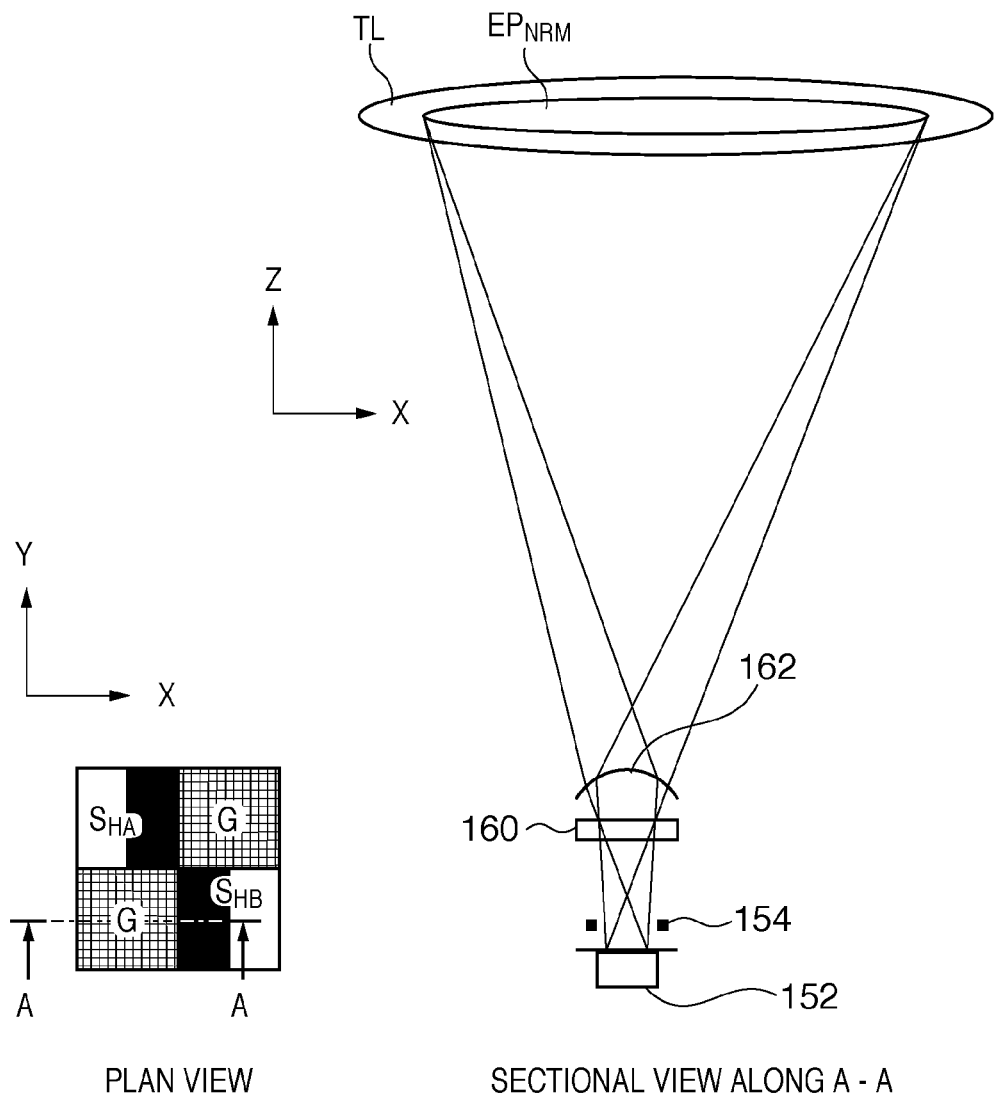
PLAN VIEW  
F I G. 8A
SECTIONAL VIEW ALONG A - A  
F I G. 8B

PLAN VIEW

SECTIONAL VIEW ALONG A - A

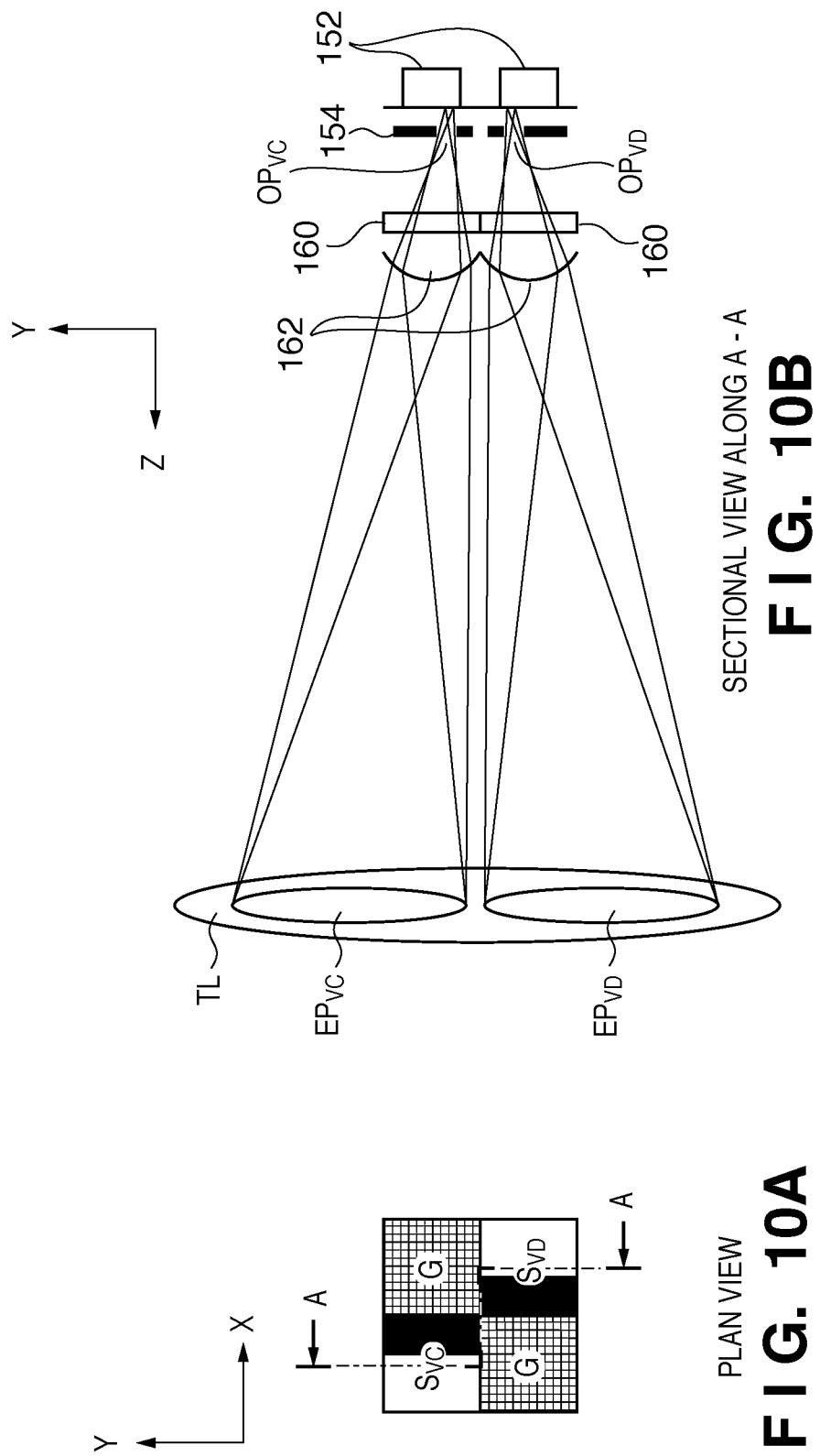

PLAN VIEW

HORIZONTAL SECTIONAL VIEW

VERTICAL SECTIONAL VIEW

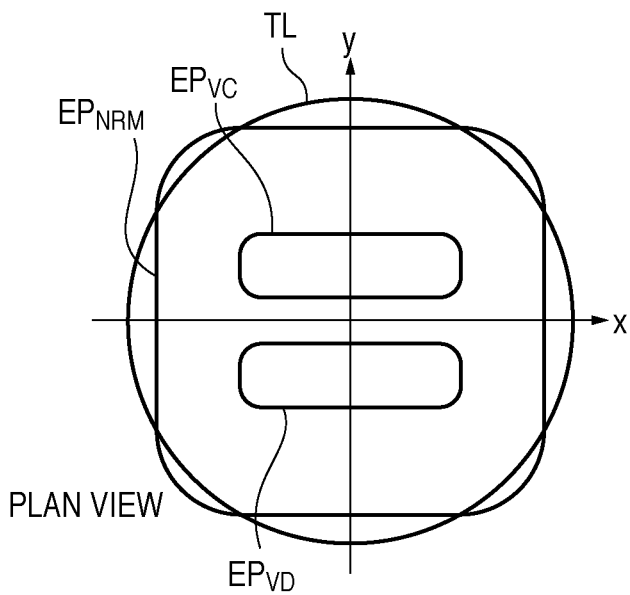
F I G. 12A
PLAN VIEW
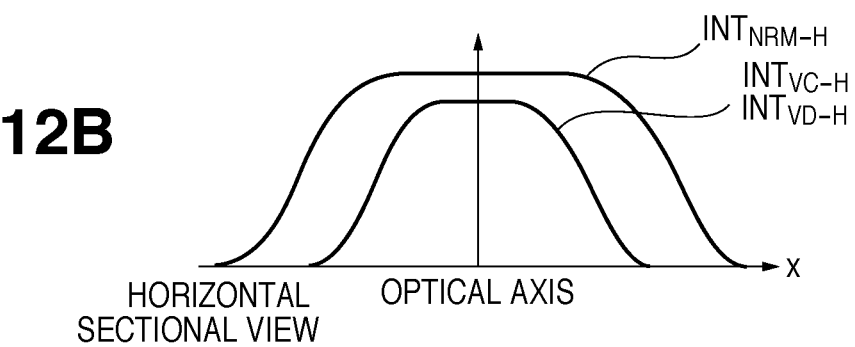
F I G. 12B
HORIZONTAL SECTIONAL VIEW
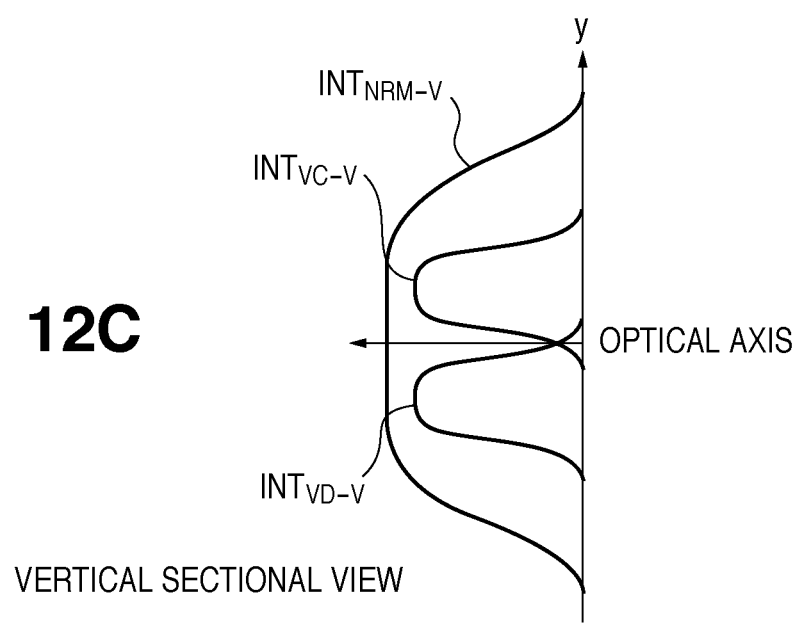
F I G. 12C
VERTICAL SECTIONAL VIEW

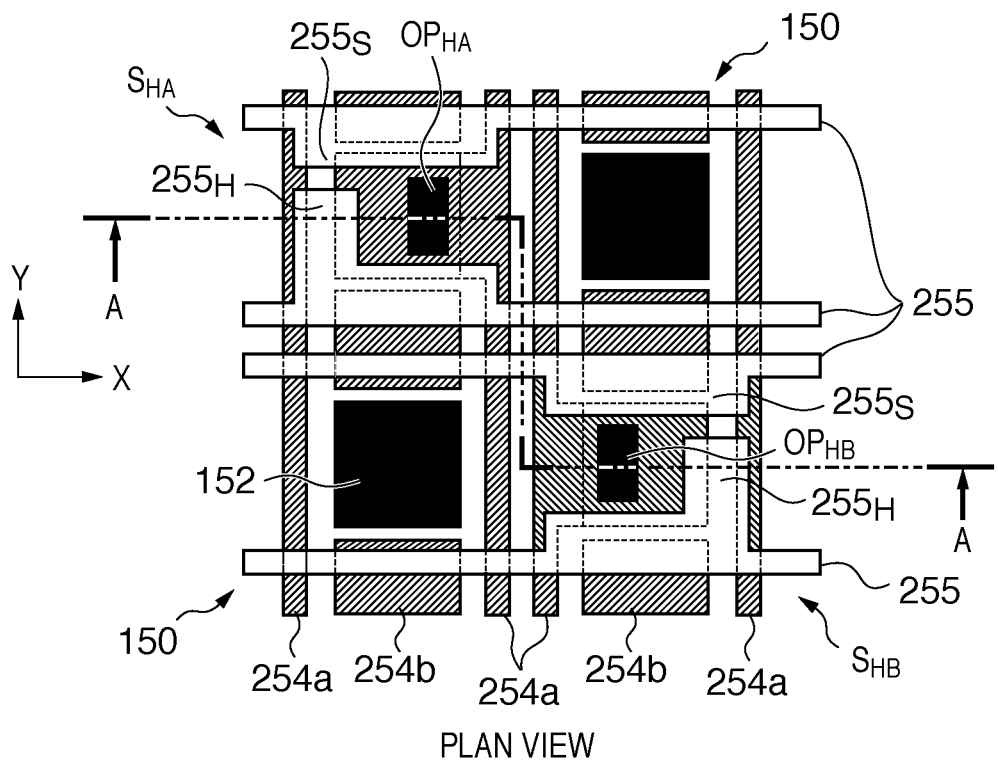
PLAN VIEW
F I G. 18A
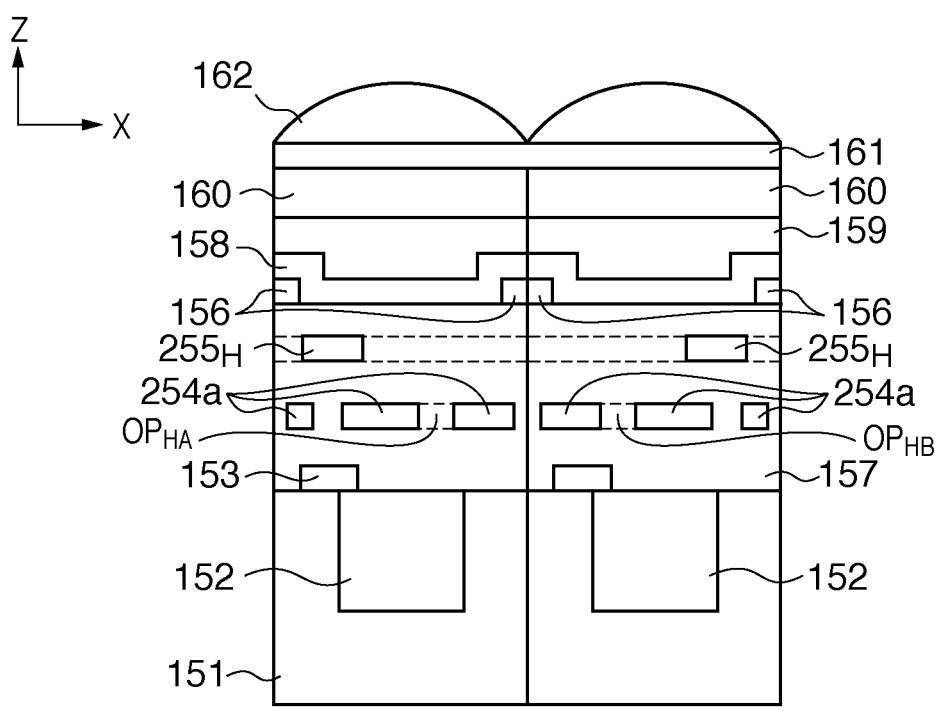
SECTIONAL VIEW ALONG A - A
F I G. 18B

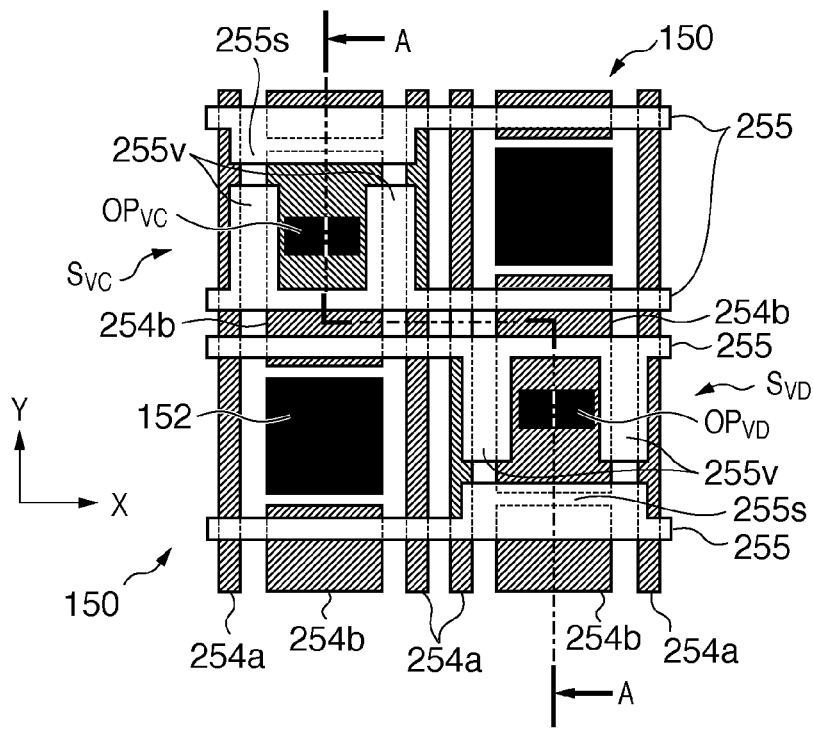
PLAN VIEW
F I G. 19A
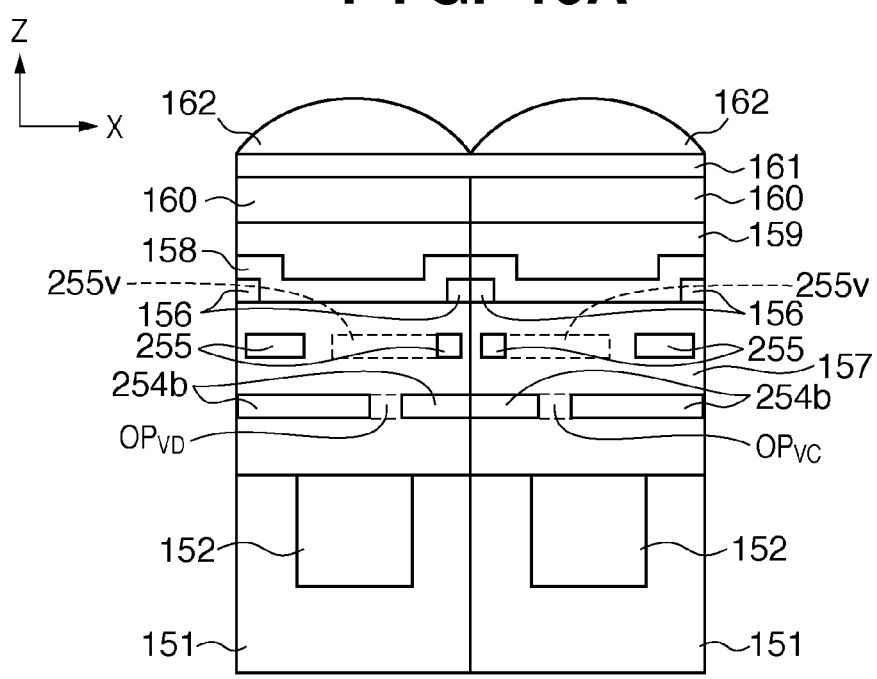
SECTIONAL VIEW ALONG A - A
F I G. 19B

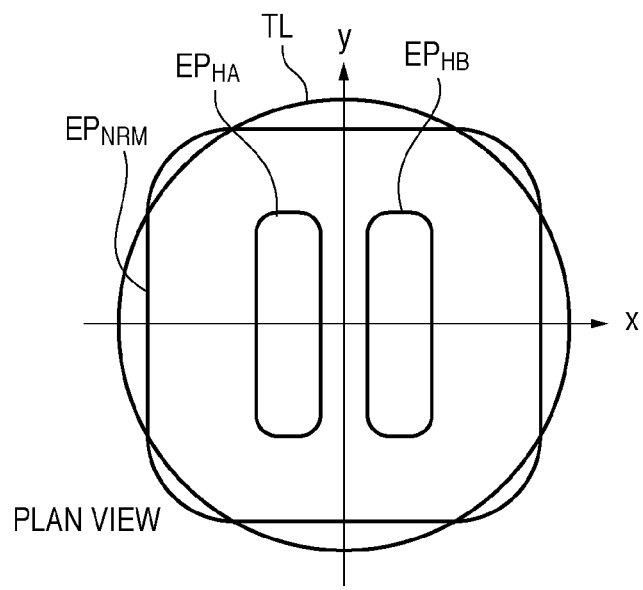
FIG. 20A PLAN VIEW
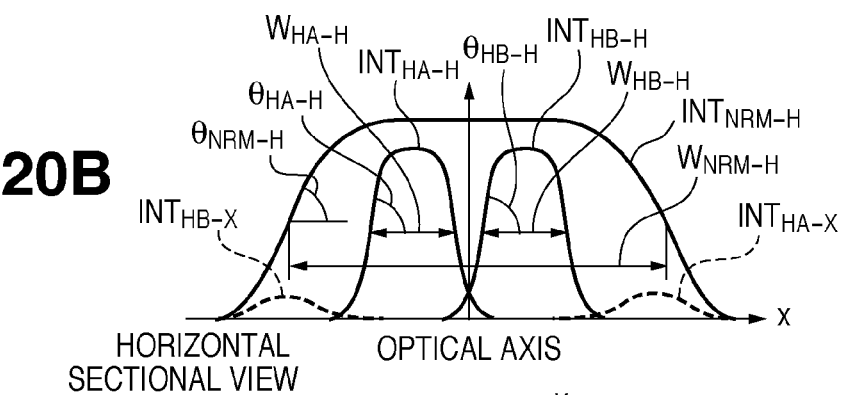
FIG. 20B HORIZONTAL SECTIONAL VIEW
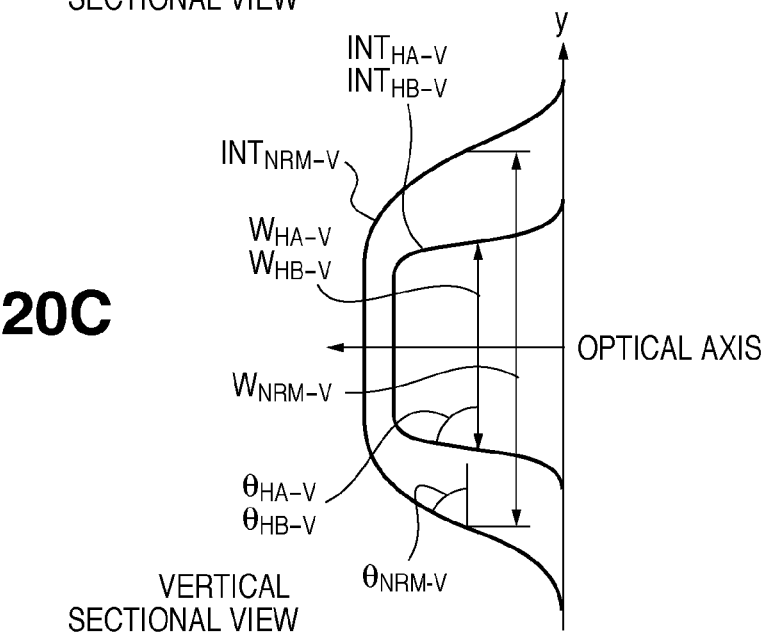
FIG. 20C VERTICAL SECTIONAL VIEW

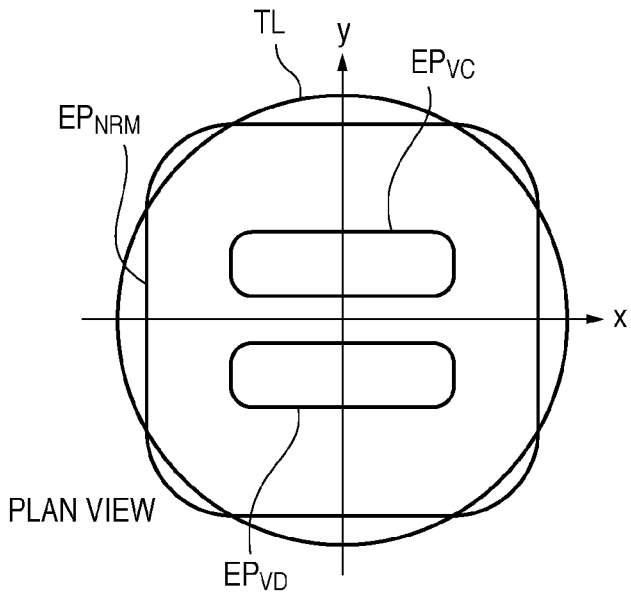
F I G. 21A
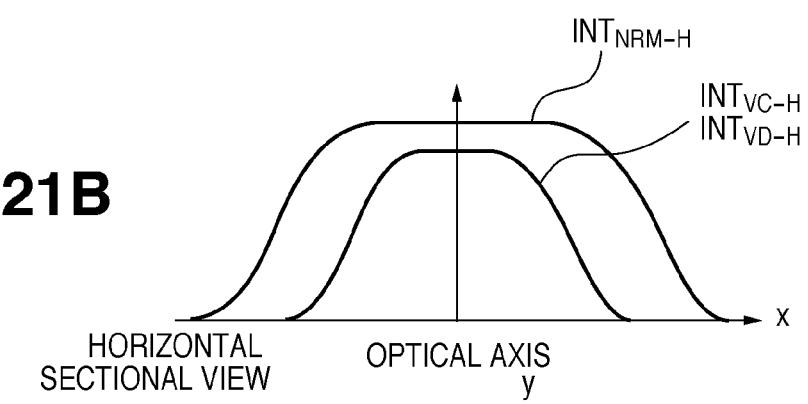
F I G. 21B
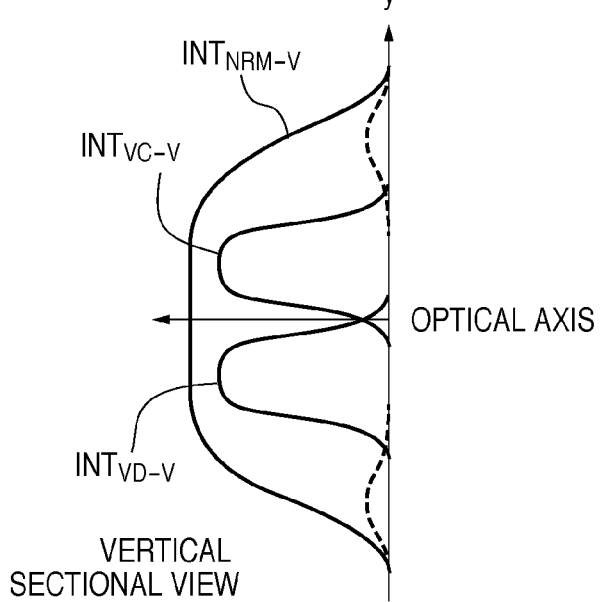
F I G. 21C

FOCUS DETECTION DEVICE AND IMAGING APPARATUS HAVING THE SAME

TECHNICAL FIELD

The present invention relates to a focus detection device and, more particularly, to a focus detection device having imaging pixels and focus-detecting pixels using a phase-difference focus detection method.

The present invention also relates to an imaging apparatus having the focus detection device.

BACKGROUND ART

There has conventionally been known a technique of implementing phase-difference focus detection AF (Auto Focus) (phase difference AF) by giving a phase-difference focus detection function to an image sensor without using a dedicated AF sensor.

For example, in Japanese Patent Laid-Open No. 2001-305415, some pixels of an image sensor are formed as focus-detecting pixels by giving a pupil division function to them. The pupil division function is provided by dividing the light receiving portion of a pixel into two. Outputs from the two light receiving portions are used as phase-difference focus detection signals, and the sum of them is used as a pixel signal.

In Japanese Patent Laid-Open No. 2000-156823 or 2008-134389, the pupil division function is given to some pixels of an image sensor by forming a rectangular opening in a light shielding layer between a microlens and a photoelectric conversion unit so that the opening is decentered from the optical axis of the microlens. These pixels having the pupil division function are arranged as focus-detecting pixels at predetermined intervals to perform phase-difference focus detection AF. Image signals at portions where the focus-detecting pixels are arranged are generated from image signals from peripheral pixels.

However, according to the technique disclosed in Japanese Patent Laid-Open No. 2001-305415, the image sensors need to be configured so that the light receiving portion of a pixel to be given the pupil division function is divided into two areas, and photoelectrically converted signals in the divided areas can be independently read out. This complicates the structure of the image sensor, which is disadvantageous in decreasing the pixel pitch. An area between the divided areas becomes a blind zone, so the sensitivity of the image sensor may decrease.

According to the techniques disclosed in Japanese Patent Laid-Open Nos. 2000-156823 and 2008-134389, a light shielding layer for pupil division needs to be arranged. However, arranging the pupil division-specific light shielding layer complicates the structure of the image sensor. Especially these days, CMOS image sensors (solid-state image sensors using a complimentary metal oxide semiconductor) have widely prevailed. The CMOS image sensor requires three electrode layers (interconnection layers) or so between a microlens and a photoelectric conversion unit. When the technique disclosed in Japanese Patent Laid-Open No. 2000-156823 or 2008-134389 is applied to the CMOS image sensor, the light shielding layer is added to the interconnection layers. The distance between the microlens and the photoelectric conversion unit will increase, decreasing the light receiving efficiency. In general, the focus position of the microlens is set near the surface of the photoelectric conversion unit. If the light shielding layer for pupil division is arranged immediately below the microlens, no desired pupil division performance can be obtained, and the focus detection precision may decrease.

DISCLOSURE OF INVENTION

The present invention has been made to overcome the conventional drawbacks, and realizes high-precision focus detection in a focus detection device having imaging pixels and focus-detecting pixels using a phase-difference focus detection method.

According to one aspect of the present invention, there is provided a focus detection device in which a plurality of pixels are arranged, each pixel having a photoelectric conversion unit for converting an incident light flux into signal charges and a microlens having a focus position near the photoelectric conversion unit, comprising: electrode groups which are used to read out signal charges converted by the photoelectric conversion units of the plurality of pixels, wherein the plurality of pixels include a plurality of imaging pixels for generating a shot image, and a plurality of focus-detecting pixels for generating an image signal for focus detection by a phase-difference focus detection method, and for the imaging pixels, the electrode groups are arranged not to block a light flux entering the photoelectric conversion units via the microlenses, and for the focus-detecting pixels, the electrode groups are arranged between the photoelectric conversion units and the microlenses to form openings for limiting a light flux in a predetermined pupil-divided direction among light fluxes entering the photoelectric conversion units via the microlenses.

According to another aspect of the present invention, there is provided an imaging apparatus comprising: a photographing optical system having a focus lens; a focus detection device according to the present invention; driving means for driving the focus lens in accordance with a defocus amount calculated by calculation means of the focus detection device; and image processing means for generating an image on the basis of signal charges read out from an imaging pixel of the focus detection device.

Further features of the present invention will become apparent from the following description of exemplary embodiments with reference to the attached drawings.

BRIEF DESCRIPTION OF DRAWINGS

FIGS. 5A and 5B are plan view and sectional view, respectively, for explaining the structure of an imaging pixel in the image sensor according to the embodiment of the present invention;

FIGS. 8A and 8B are plan view and sectional view, respectively, for explaining pupil projection of an imaging pixel in the image sensor according to the embodiment of the present invention;

FIGS. 10A and 10B are plan view and sectional view, respectively, for explaining pupil projection of a pixel (focus-detecting pixel) for phase-difference focus detection in the vertical direction (Y direction) of the photographing optical system in the image sensor according to the embodiment of the present invention;

FIG. 12A to FIG. 12C are plan view and graphs, respectively, for explaining the pupil sharpnesses of focus-detecting pixels $S_{VC}$ and $S_{VD}$ and an imaging pixel in the image sensor according to the first embodiment of the present invention;

FIGS. 18A and 18B are plan view and sectional view, respectively, for explaining the structure of a focus-detecting pixel (for horizontal phase-difference focus detection) in an image sensor according to the second embodiment of the present invention;

FIGS. 19A and 19B are plan view and sectional view, respectively, for explaining the structure of a focus-detecting pixel (for vertical phase-difference focus detection) in the image sensor according to the second embodiment of the present invention;

FIG. 20A to FIG. 20C are plan view and graphs, respectively, for explaining the pupil sharpnesses of focus-detecting pixels $S_{HA}$ and $S_{HB}$ and an imaging pixel in the image sensor according to the second embodiment of the present invention; and FIG. 21A to FIG. 21C are plan view and graphs, respectively, for explaining the pupil sharpnesses of focus-detecting pixels $S_{VC}$ and $S_{VD}$ and an imaging pixel in the image sensor according to the second embodiment of the present invention.

BEST MODE FOR CARRYING OUT THE INVENTION

Preferred embodiments of the present invention will now be described in detail in accordance with the accompanying drawings.

[First Embodiment]

Figure 1:
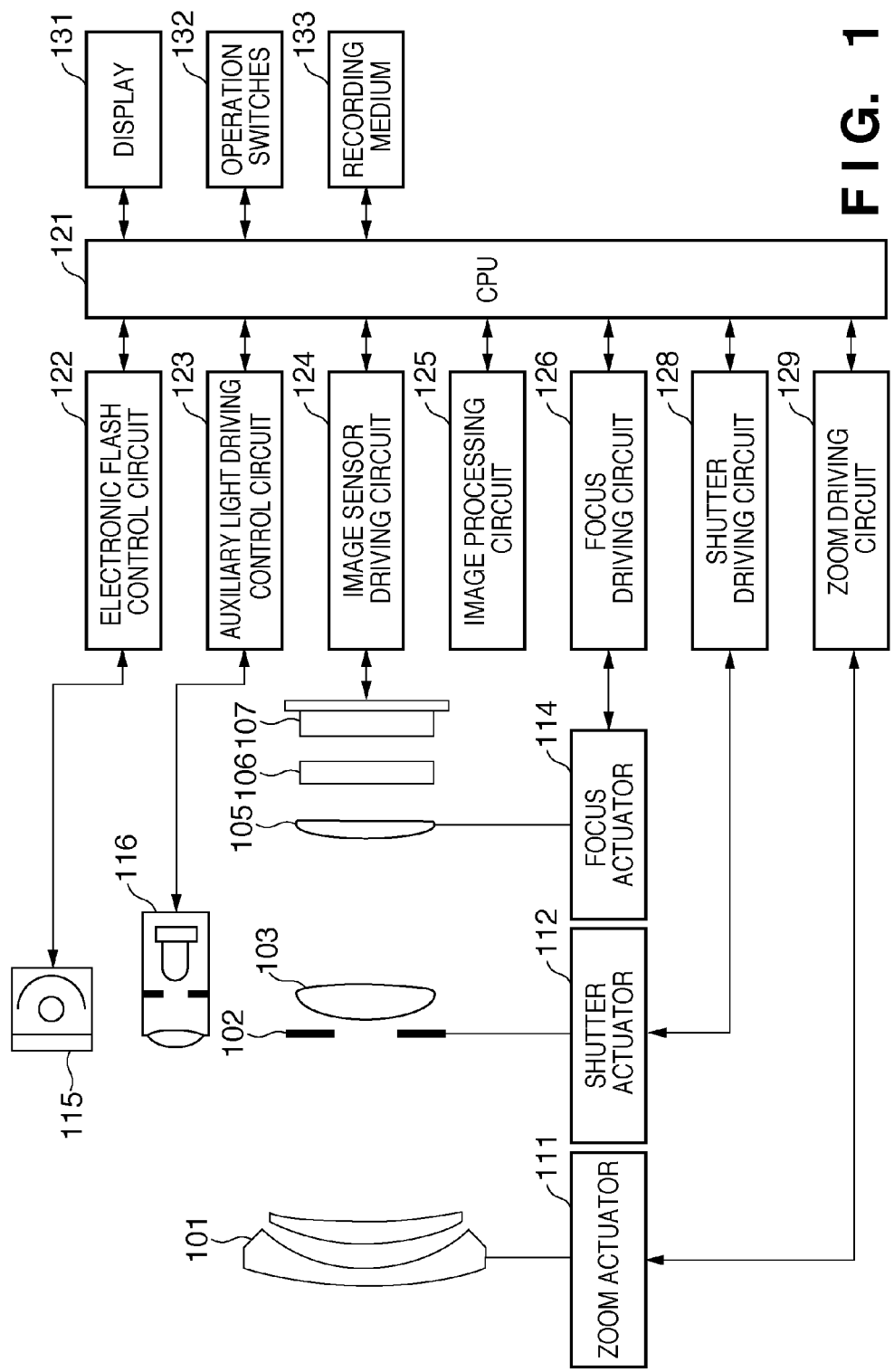
FIG. 1 is a view showing an example of the arrangement of a digital camera as an example of an imaging apparatus to which a focus detection device according to an embodiment of the present invention is applicable.

FIG. 1 is a view showing an example of the arrangement of a digital camera as an example of an imaging apparatus to which a focus detection device according to the first embodiment of the present invention is applicable.

A first lens group 101 is arranged on the first stage of a photographing optical system (image forming optical system), and held to be movable along the optical axis. A shutter 102 functions as a shutter for controlling the exposure time in still image shooting, and also a stop for adjusting the light quantity in shooting by adjusting the aperture diameter. A second lens group 103 arranged behind the shutter 102 (on the image sensor side) can move along the optical axis together with the shutter 102, and provides a zoom function together with the first lens group 101.

A third lens group 105 is a focus lens, and can move along the optical axis. An optical low-pass filter 106 is arranged in front of an image sensor 107, and reduces a false color and moire generated in a shot image. The image sensor 107 which forms the focus detection device includes a CMOS image sensor and its peripheral circuit. In the first embodiment, the image sensor 107 is a two-dimensional 1CCD color image sensor in which m×n light receiving elements are arranged two-dimensionally in the lateral and longitudinal directions, and an on-chip primary color mosaic filter with the Bayer array is formed on them. The color filter limits the wavelength of transmitted light entering the light receiving element for each pixel.

A zoom actuator 111 pivots a cam cylinder (not shown) to drive the first lens group 101 and/or third lens group 105 along the optical axis under the control of a zoom driving circuit 129. A shutter actuator 112 drives the shutter 102 with a predetermined aperture diameter at a predetermined open/close timing under the control of a shutter driving circuit 128.

A focus actuator 114 drives the third lens group 105 along the optical axis under the control of a focus driving circuit 126.

An electronic flash 115 is preferably a flash illumination device using a xenon tube, but may also be an illumination device having a continuous emission LED. An AF auxiliary light output unit 116 projects a mask image of a predetermined aperture pattern to the field, and assists focus detection in shooting at a dark place or for a low-contrast object.

A CPU 121 controls the overall operation of the digital camera, and includes an arithmetic unit, ROM, RAM, A/D converter, D/A converter, communication interface circuit, and the like (none of them is shown). The CPU 121 provides digital camera functions such as AF, AE, image processing, and recording by executing a program stored in the ROM and controlling various circuits.

An electronic flash control circuit 122 controls the ON operation of the electronic flash 115 in the shooting operation. An auxiliary light driving control circuit 123 controls the ON operation of the AF auxiliary light output unit 116 in the focus detection operation. An image sensor driving circuit 124 controls the operation of the image sensor 107. In addition, the image sensor driving circuit 124 A/D-converts an image signal read out from the image sensor 107, and outputs it to the CPU 121. An image processing circuit 125 applies image processes such as γ conversion, color interpolation, and JPEG encoding to an image signal.

The focus driving circuit 126 drives the focus actuator 114 on the basis of the focus detection result, and moves the third lens group 105 along the optical axis to adjust the focus. The shutter driving circuit 128 drives the shutter actuator 112 to control the aperture diameter and open/close timing of the shutter 102. The zoom driving circuit 129 drives the zoom actuator 111 in accordance with a zoom operation designated by the user by pressing, for example, a zoom operation switch among operation switches 132.

A display 131 is, for example, an LCD, and displays information on the shooting mode of the digital camera, a preview image before shooting, a confirmation image after shooting, in-focus information upon focus detection, and the like. The operation switches 132 include a power switch, release (shooting trigger) switch, zoom operation switch, and shooting mode selection switch. A recording medium 133 is, for example, a detachable semiconductor memory card, and records a shot image.

Figure 2:
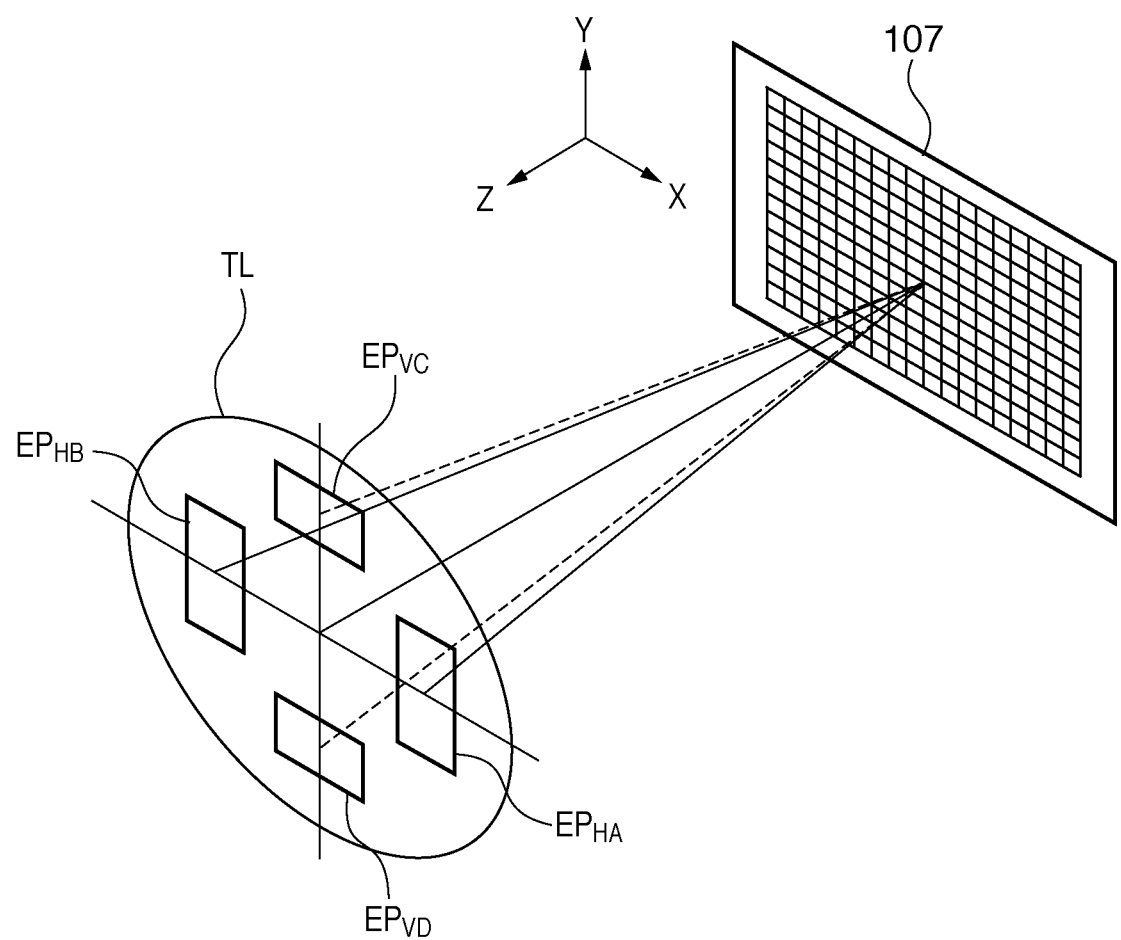
FIG. 2 is a view for explaining the concept of pupil division when performing focus detection by a phase-difference focus detection method in the digital camera according to the embodiment of the present invention.

FIG. 2 is a view for explaining the concept of pupil division when performing focus detection by the phase-difference focus detection method in the digital camera according to the embodiment. In the following description, the pupil is divided in the horizontal direction serving as the first pupil-divided direction and the vertical direction serving as the second pupil-divided direction perpendicular to the first pupil-divided direction.

Some pixels of the image sensor 107 are given the pupil division function for phase-difference focus detection. $EP_{HA}$ and $EP_{HB}$ are pupil areas for phase-difference focus detection in the horizontal direction (X direction). $EP_{VC}$ and $EP_{VD}$ are pupil areas for phase-difference focus detection in the vertical direction (Y direction). These four pupil areas are formed by projecting the pupil-dividing openings of focus-detecting pixels onto the exit pupil TL of the photographing optical system via on-chip microlenses.

Figure 3:
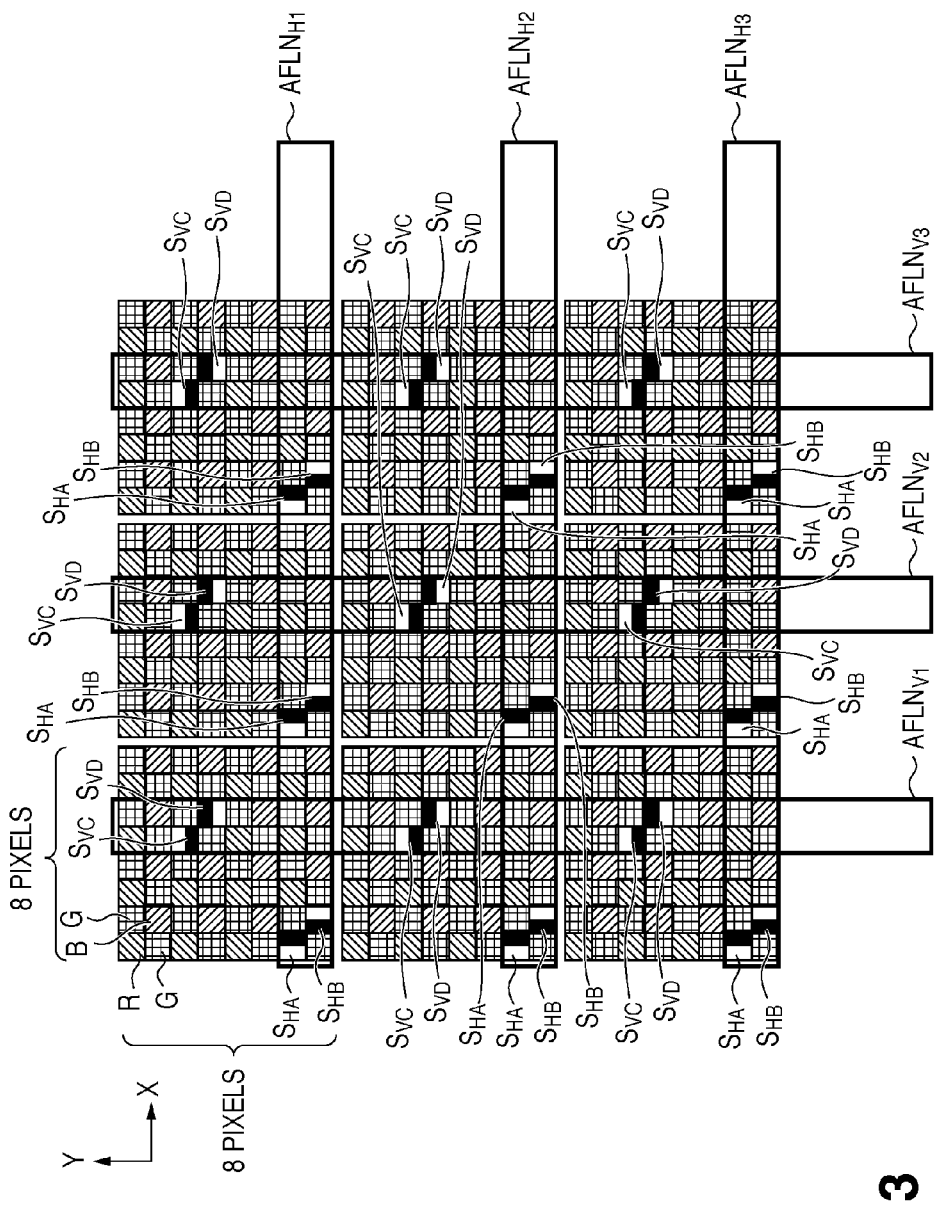
FIG. 3 is a view showing an example of the layout of focus-detecting pixels in an image sensor which forms the focus detection device according to the embodiment of the present invention.

FIG. 3 is a view showing an example of the layout of focus-detecting pixels in the image sensor 107 which forms the focus detection device according to the embodiment.

As described above, the image sensor 107 in the first embodiment is formed by two-dimensionally arranging a plurality of pixels. The image sensor 107 employs a Bayer array in which two pixels having G (Green) spectral sensitivity are diagonally arranged among 2×2=4 pixels, and a pixel having R (Red) spectral sensitivity and one having B (Blue) spectral sensitivity are arranged as the two remaining pixels.

One block includes 8×8=64 pixels. A pair of focus-detecting pixels $S_{HA}$ and $S_{HB}$ for horizontally dividing the pupil, and a pair of focus-detecting pixels $S_{VC}$ and $S_{VD}$ for vertically dividing the pupil are arranged in each block. In the embodiment, the arrangement of focus-detecting pixels is common to respective blocks. Blocks are repetitively arranged with regularity in the pixel area of the image sensor 107.

A method of using output signals from focus-detecting pixels will be explained. In FIG. 3, $AFLN_{H1}$ to $AFLN_{H3}$ are focus detection lines for detecting a horizontal phase difference. The defocus amount of an image is calculated by computing the phase difference between the first image signal made up of output signals from the focus-detecting pixels $S_{HA}$ on each line, and the second image signal made up of output signals from the focus-detecting pixels $S_{HB}$ on the same line.

Similarly, $AFLN_{V1}$ to $AFLN_{V3}$ are focus detection lines for detecting a vertical phase difference. The defocus amount of an image is calculated by computing the phase difference between the third image signal made up of output signals from the focus-detecting pixels $S_{VC}$ on each line, and the fourth image signal made up of output signals from the focus-detecting pixels $S_{VD}$ on the same line.

FIG. 4 to FIG. 7B are views for explaining an example of the structures of imaging pixels and focus-detecting pixels in the image sensor 107.

Figure 4:
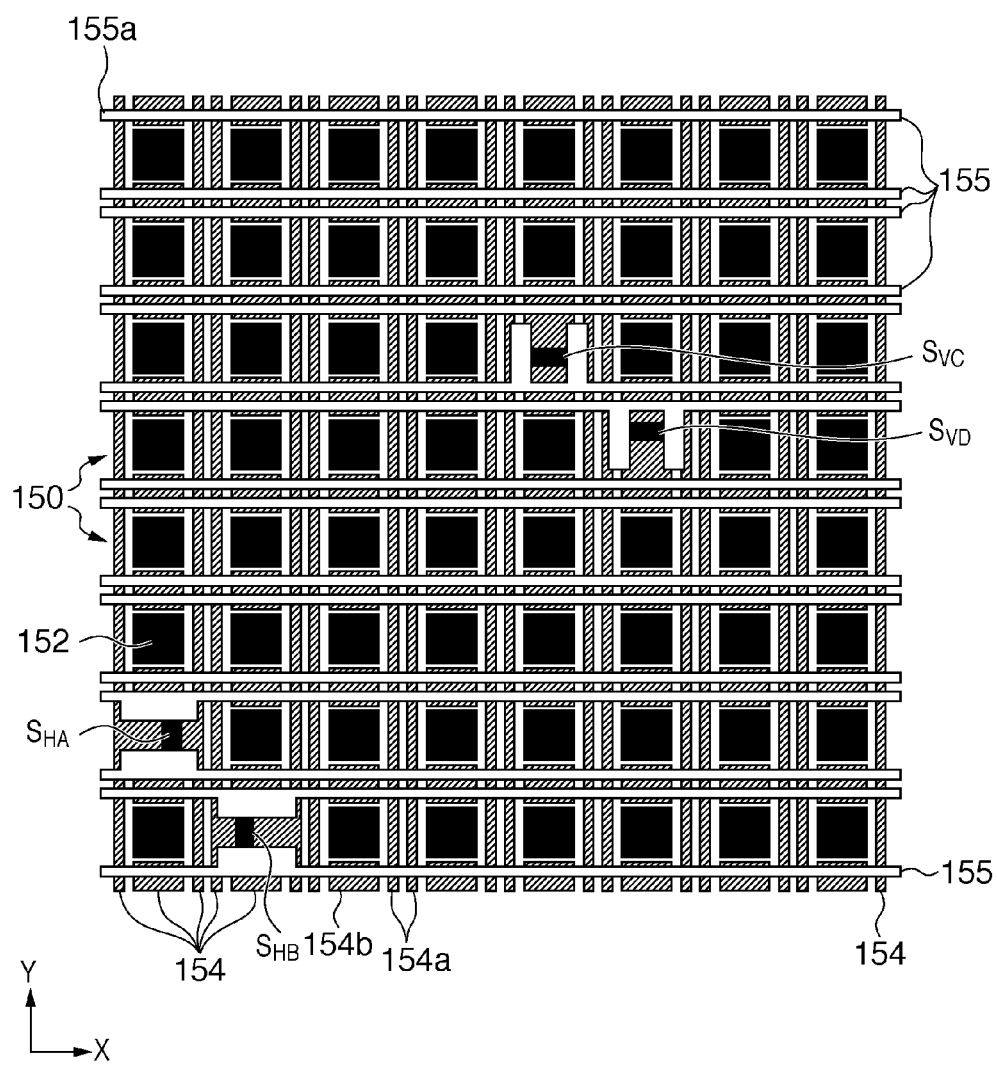
FIG. 4 is an enlarged plan view of one block shown in FIG. 3 when viewed from a photographing optical system.

FIG. 4 is an enlarged plan view of one block shown in FIG. 3 when viewed from the photographing optical system.

In FIG. 4, photoelectric conversion units 152 represented by black rectangles are arranged on the lowermost layers of pixels, and have almost the square shape in all pixels. As will be described later, pixels 150 in which the entire photoelectric conversion units 152 are exposed are imaging pixels. Pixels $S_{HA}$, $S_{HB}$, $S_{VC}$, and $S_{VD}$ in which the photoelectric conversion units 152 are partially exposed are focus-detecting pixels. Outputs from the photoelectric conversion units 152 are read out via first and second electrode groups 154 and 155. The first and second electrode groups 154 and 155 are electrically connected with each other via through-holes (not shown) provided at areas depicted as overlapped sections in FIG. 4. Although not shown in FIG. 4, the third electrode group, color filter, microlens, and the like are formed in order from the bottom on the second electrode group 155.

The first electrode group 154 arranged above (on the light incident side) the photoelectric conversion unit 152 elongates in the Y direction (upward in FIG. 4). The first electrode group 154 includes linear electrodes 154a arranged regularly in the X direction (right in FIG. 4), and island-shaped electrodes 154b arranged in respective pixels. Note that the island-shaped electrodes 154b each electrically connected, via a through-hole (not shown), to a charge accumulation unit and a switching device reside in its lower layer (i.e., in the same plane as the photoelectric conversion unit 152) as well as the second electrode group 155 reside in its upper layer. This means that the island-shaped electrodes 154b act as interconnecting electrodes. Therefore, in the following description, the linear electrodes 154a are referred to as a "primary electrode group for signal transmission" and the island-shaped electrodes 154b are referred to as an "interconnecting electrode group". The second electrode group 155 arranged above the first electrode group 154 elongates in the X direction. The second electrode group 155 includes linear electrode 155a arranged regularly in the Y direction. Signal charges generated in the photoelectric conversion unit 152 are output to a subsequent circuit via a floating diffusion (not shown), the first electrode group 154, and the second electrode group 155.

According to the first embodiment, in the imaging pixels, the first and second electrode groups 154 and 155 are formed with minimum widths so as not to block a light flux entering the photoelectric conversion unit 152. In the focus-detecting pixels $S_{HA}$, $S_{HB}$, $S_{VC}$, and $S_{VD}$, the line width of the electrode is partially extended to form a slit for giving the pupil division function. The structure for forming a slit using the first and second electrode groups 154 and 155 will be explained in detail later with reference to FIG. 6 and subsequent drawings.

FIGS. 5A and 5B are views for explaining the structure of the imaging pixel in the image sensor 107 according to the first embodiment. FIG. 5A is a plan view of four pixels, that is, the focus-detecting pixels $S_{HA}$ and $S_{HB}$ and two imaging pixels 150 in FIG. 4. FIG. 5B is a sectional view of one imaging pixel 150 taken along the line A-A in FIG. 5A.

The structure of the imaging pixel 150 will be explained with reference to FIG. 5B.

The photoelectric conversion unit 152 is buried in a silicon substrate 151. A transparent polysilicon electrode 153 is formed on the upper surfaces of the photoelectric conversion unit 152 and silicon substrate 151. The first electrode group 154, the second electrode group 155, and a third electrode group 156 having a multilayered structure are formed above the transparent polysilicon electrode 153. The third electrode group 156 is arranged at the boundary between pixels, and has the # shape (not shown in FIG. 5A). The first to third electrode groups 154 to 156 of the three layers each are formed by etching an aluminum or copper metal film. The first to third electrode groups 154 to 156 are insulated from each other by a transparent interlayer dielectric film 157 made of $SiO_2$ or the like. A passivation film 158 covers the top of the third electrode group 156. Reference numeral 159 denotes a first planarized layer; 160, a color filter which is a green (G) filter in FIG. 5B; 161, a second planarized layer; and 162, an on-chip microlens (to be also simply referred to as a microlens).

The first function demanded of the imaging pixel 150 is to efficiently guide, to the photoelectric conversion unit 152, an incident light flux having passed through the photographing optical system. The second function demanded of the imaging pixel 150 is to prevent a decrease in light flux transmission efficiency even if the photographing optical system is exchanged or optical characteristics change upon a zoom operation or focus adjusting operation. To achieve these functions, the shape of the microlens 162 is generally set to locate the focus position of the microlens 162 near the upper surface of the photoelectric conversion unit 152. The widths of the first and second electrode groups 154 and 155 are minimized to prevent the first and second electrode groups 154 and 155 from blocking a light flux entering the microlens 162.

Figure 6A:
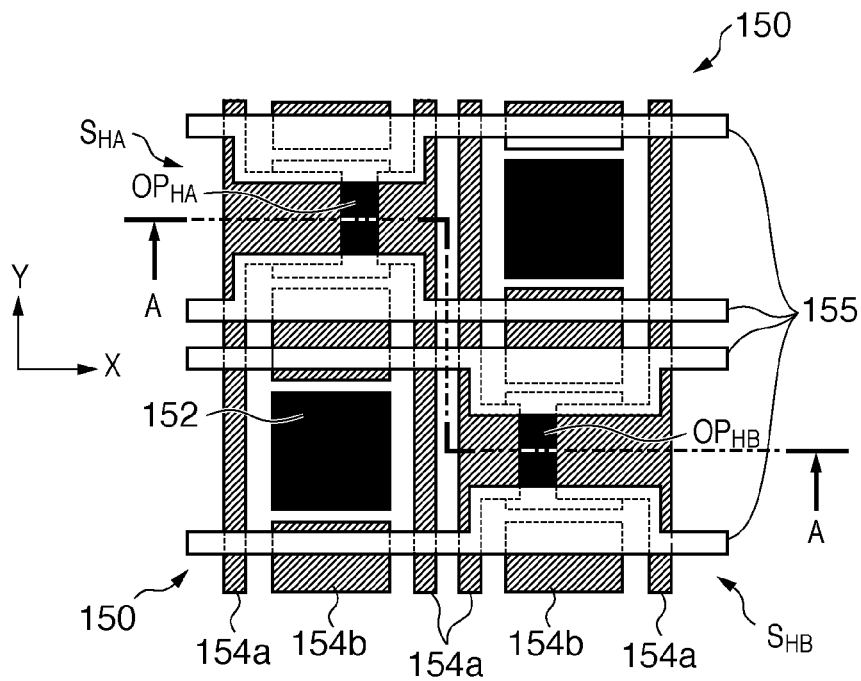
FIGS. 6A and 6B are plan view and sectional view, respectively, for explaining the structure of a focus-detecting pixel (for horizontal phase-difference focus detection) in the image sensor according to the first embodiment of the present invention.
Figure 6B:
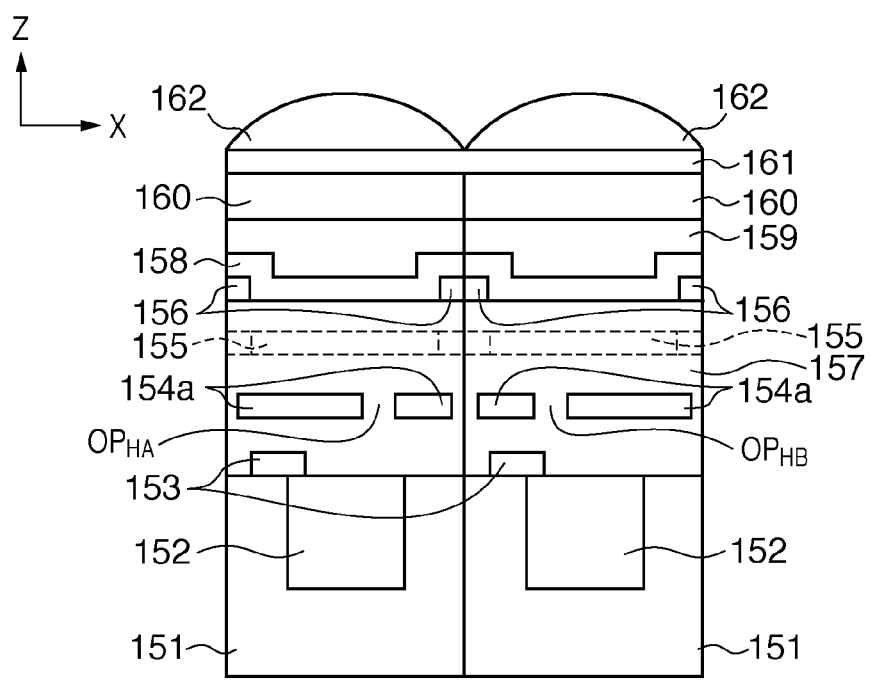

FIGS. 6A and 6B are views for explaining the structure of a focus-detecting pixel (for horizontal phase-difference focus detection) in the image sensor 107 according to the first embodiment.

FIG. 6A is a plan view of four pixels identical to those in FIG. 5A. FIG. 6B is a sectional view of the focus-detecting pixels $S_{HA}$ and $S_{HB}$ taken along the line A-A in FIG. 6A.

The structure of the imaging pixel 150 shown in FIGS. 5A and 5B and that of the focus-detecting pixels $S_{HA}$ and $S_{HB}$ are different in the shapes of the first and second electrode groups 154 and 155 in the pixel. More specifically, in the focus-detecting pixels $S_{HA}$ and $S_{HB}$, the widths of the first and second electrode groups 154 and 155 are controlled to form a slit. In this way, the first embodiment forms a focus-detecting pixel by giving the pupil division function to a pixel using the first and second electrode groups 154 and 155 as light shielding films.

When pupil division on the exit pupil plane of the photographing optical system is implemented by the microlens in the imaging pixel and an opening formed by the light shielding member, the sharpness of pupil imaging (pupil division characteristic) is readily decreased by diffraction of light caused by a small size of each member or spherical aberration of the microlens. If paired pupil areas overlap each other or are eclipsed by the photographing optical system, the focus detection precision of the phase-difference focus detection method decreases. Hence, it is desirable to definitely divide a pair of pupils and minimize eclipse caused by the photographing optical system especially in the pupil-divided direction.

As described with reference to FIG. 5B, the microlens 162 is set to locate its focus position near the uppermost surface of the photoelectric conversion unit 152. In order to obtain a preferable pupil division characteristic, a light shielding member for limiting a light flux in the pupil-divided direction needs to be arranged near the focus position of the microlens 162. However, the CMOS image sensor requires a plurality of electrode layers between the microlens and the photoelectric conversion unit, as described above. If a dedicated light shielding layer is further arranged, this complicates the structure of the image sensor, increases the distance between the microlens and the photoelectric conversion unit, and decreases the light receiving efficiency of the imaging pixel.

From this, the first embodiment uses electrode groups originally included in the CMOS image sensor as a light shielding film. The first embodiment implements a preferable pupil division characteristic while preventing complication of the image sensor structure and suppressing an increase in the distance between the microlens and the photoelectric conversion unit 152. FIG. 6A does not illustrate the structure of the third electrode group 156 and its upper layer, similar to FIG. 5A.

Referring to FIG. 6A, the line widths of the first and second electrode groups 154 and 155 are minimized in the imaging pixel 150. To the contrary, in the focus-detecting pixels $S_{HA}$ and $S_{HB}$, the line width of the first electrode group 154 is partially extended toward the center of the photoelectric conversion unit 152. Similarly, the width of the second electrode group 155 is partially extended toward the center of the photoelectric conversion unit 152. The electrode groups of the two layers form a pair of slits $OP_{HA}$ and $OP_{HB}$.

Of four sides which define each slit, two sides (longer sides) which limit a light flux in the horizontal direction (X direction) parallel to the pupil-divided direction are defined by the first electrode group 154 positioned near the focus position of the microlens 162. Two sides (shorter sides) which limit a light flux in a direction (Y direction) perpendicular to the pupil-divided direction are defined by the second electrode group 155 positioned farther from the focus position of the microlens 162 than the first electrode group 154. In this fashion, a light flux in the pupil-divided direction is limited by an electrode group arranged near the focus position of the microlens 162 out of electrode groups having the multilayered structure, thereby increasing the pupil sharpness in the phase-difference focus detection direction. Paired slits are decentered by a predetermined amount in opposite directions from the optical axes of corresponding microlenses. As a result, a pair of pupils is projected on the photographing optical system at a predetermined interval, giving pixels the pupil division function for phase-difference focus detection.

When an opening is formed using electrode groups of different layers out of electrode groups having the multilayered structure, an electrode group which defines sides for limiting a light flux in a direction parallel to the pupil-divided direction suffices to be one other than an electrode group in a layer farthest from the focus position of the microlens 162 out of the electrode groups having the multilayered structure. An electrode group which defines sides for limiting a light flux in a direction perpendicular to the pupil-divided direction suffices to be one of a layer farther from the focus position of the microlens 162 than the electrode group which defines sides for limiting a light flux in the direction parallel to the pupil-divided direction out of the electrode groups having the multilayered structure.

In the first embodiment, the first electrode group 154 out of the electrode groups 154 to 156 of three layers is farthest from the microlens 162. This structure can provide high pupil sharpness. In addition, this structure can reduce the angular misalignment of the center axis of the pupil arising from the alignment error between the optical axis of the microlens 162 and the electrode pattern.

Figure 7A:
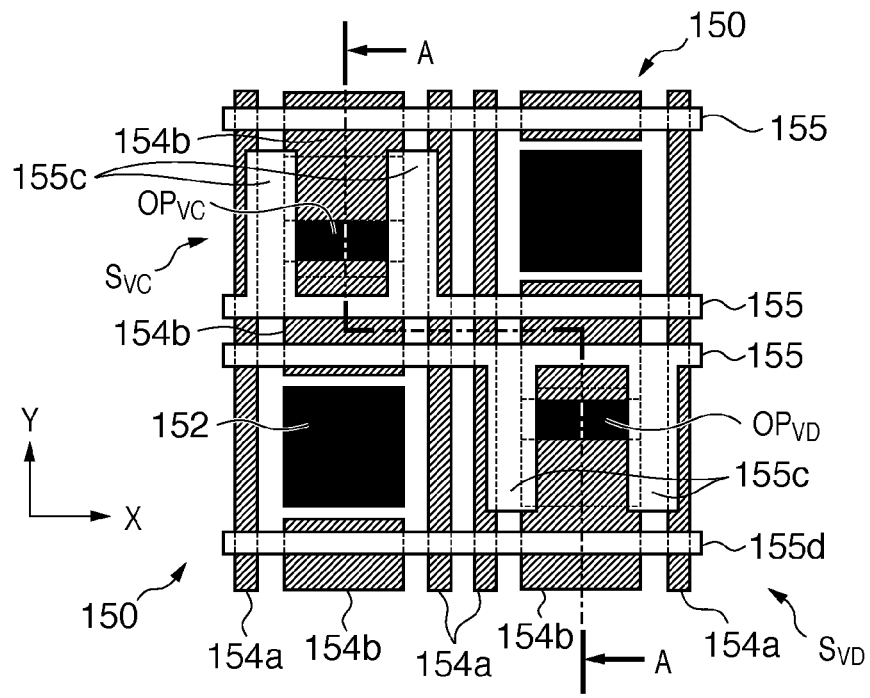
FIGS. 7A and 7B are plan view and sectional view, respectively, for explaining the structure of a focus-detecting pixel (for vertical phase-difference focus detection) in the image sensor according to the first embodiment of the present invention.
Figure 7B:
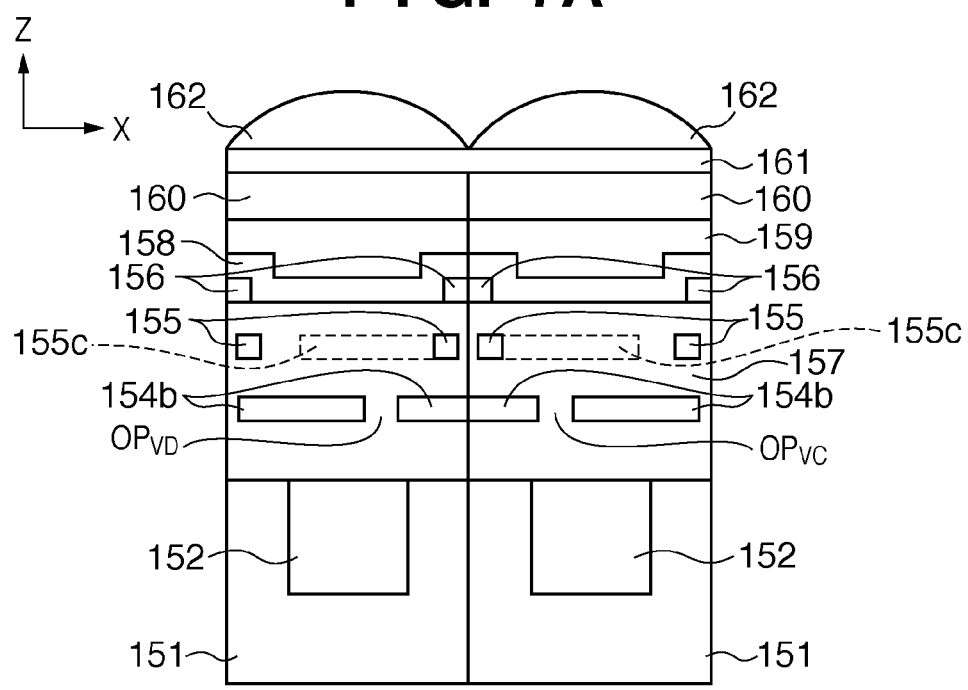

FIGS. 7A and 7B are views for explaining the structure of a focus-detecting pixel (for vertical phase-difference focus detection) in the image sensor 107 according to the first embodiment.

FIG. 7A is an enlarged plan view of four pixels, that is, the focus-detecting pixels $S_{VC}$ and $S_{VD}$ and two imaging pixels 150 in FIG. 4. FIG. 7B is a sectional view of the focus-detecting pixels $S_{VC}$ and $S_{VD}$ taken along the line A-A in FIG. 7A. The sectional structure shown in FIG. 7B is substantially the same as those shown in FIGS. 5B and 6B, and a description thereof will not be repeated.

The structure of the pupil-dividing slit of the focus-detecting pixel for vertical phase-difference focus detection will be explained with reference to FIG. 7A.

In the focus-detecting pixels $S_{VC}$ and $S_{VD}$ for vertical phase-difference focus detection, the first and second electrode groups 154 and 155 run in the same directions as those in the focus-detecting pixels $S_{HA}$ and $S_{HB}$ for horizontal phase-difference focus detection shown in FIGS. 6A and 6B. However, the pupil-divided directions are different by 90°. Thus, the shapes of electrodes for forming pupil-dividing slits change as follows.

A member which limits a light flux in the pupil-divided direction, that is, Y direction is not the primary electrode group for signal transmission 154a (see FIG. 4) of the first electrode group 154 that runs in the Y direction, but the island-shaped interconnecting electrode group 154b arranged at the boundary between pixels. As shown in the plan view of FIG. 7A, the width of the interconnecting electrode group 154b is extended toward the center of the photoelectric conversion unit 152 to cover the upper portion of the photoelectric conversion unit 152. A member which limits a light flux in a direction, that is, X direction perpendicular to the pupil-divided direction is formed by extending the width of a part of the second electrode group 155 running in the Y direction. However, the shape of this member is different from that of a member which limits a light flux in the Y direction in a focus-detecting pixel for horizontal phase-difference focus detection. As shown in FIGS. 7A and 7B, paired portions 155c extended from one electrode define two sides of a slit in the Y direction. The shape of electrodes 155d facing each other via the photoelectric conversion unit 152 remains unchanged. The pair of extended portions 155c may also be formed from a pair of electrodes facing each other via the photoelectric conversion unit 152.

With this structure, pupil-dividing slits $OP_{VC}$ and $OP_{VD}$ are formed. The shapes of the paired slits $OP_{VC}$ and $OP_{VD}$ are substantially the same as those obtained by rotating the slits $OP_{HA}$ and $OP_{HB}$ shown in FIG. 6A by 90° about the Z-axis.

The pupil projection relationship between the photographing optical system and each pixel will be explained with reference to FIG. 8A to FIG. 10B.

FIGS. 8A and 8B are views for explaining pupil projection of an imaging pixel. FIGS. 8A and 8B are a plan view and sectional view, respectively, showing the same imaging pixel as that in FIGS. 5A and 5B. The sectional view simply illustrates only the main part of the internal structure of the pixel.

As shown in FIG. 8B, the upper surface of the photoelectric conversion unit 152 is projected onto the pupil plane of the photographing optical system via the microlens 162. As described above, an imaging pixel is configured to efficiently receive a light flux having passed through the entire exit pupil TL of the photographing optical system. A pupil $EP_{NRM}$ on which the photoelectric conversion unit 152 is projected has a shape which almost covers the exit pupil. TL of the photographing optical system.

Figures 9A, 9B:
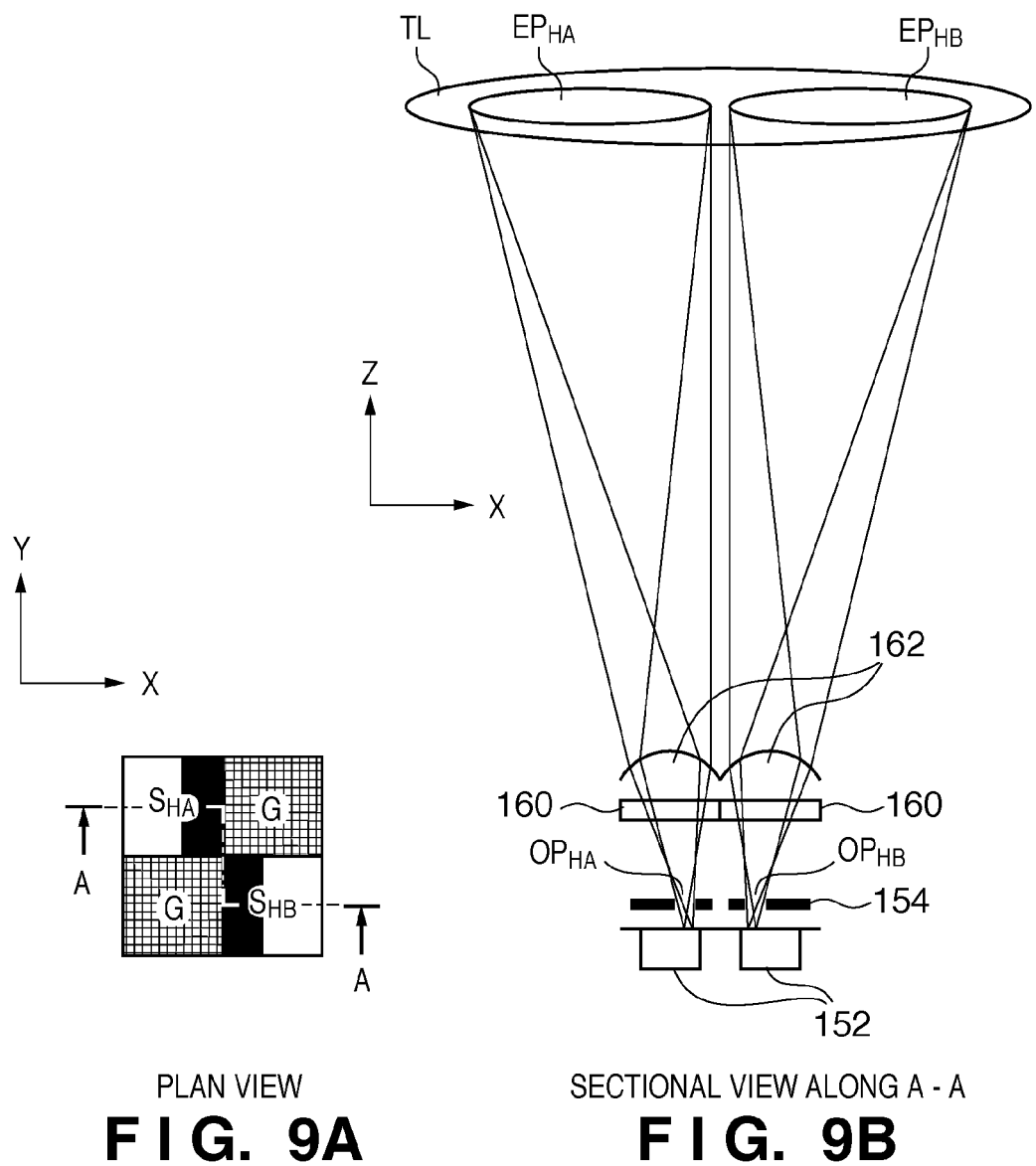
FIGS. 9A and 9B are plan view and sectional view, respectively, for explaining pupil projection of a pixel (focus-detecting pixel) for phase-difference focus detection in the horizontal direction (X direction) of the photographing optical system in the image sensor according to the embodiment of the present invention.

FIGS. 9A and 9B are views for explaining pupil projection of a pixel (focus-detecting pixel) for phase-difference focus detection in the horizontal direction (X direction) in the photographing optical system. FIGS. 9A and 9B correspond to FIGS. 6A and 6B.

As shown in FIG. 9B which is a sectional view taken along the line A-A in FIG. 9A, the slit $OP_{HA}$ of the pixel $S_{HA}$ is projected as a pupil $EP_{HA}$ on the exit pupil TL of the photographing optical system via the microlens 162. Similarly, the slit $OP_{HB}$ of the pixel $S_{HB}$ is projected as a pupil $EP_{HB}$. That is, the exit pupil TL of the photographing optical system is divided into a pair of focus-detecting pupils $EP_{HA}$ and $EP_{HB}$. The pixel $S_{HA}$ receives a light flux having passed through the divided pupil $EP_{HA}$, and the pixel $S_{HB}$ receives a light flux having passed through the pupil $EP_{HB}$.

As shown in FIG. 3, the pixels $S_{HA}$ and $S_{HB}$ are regularly arranged in the horizontal direction. The defocus amount of an object image can be detected by detecting the image shift amount, that is, phase difference between the first image signal generated by concatenating outputs from a plurality of pixels $S_{HA}$ and the second image signal generated by concatenating outputs from a plurality of pixels $S_{HB}$.

FIGS. 10A and 10B are views for explaining pupil projection of a pixel for phase-difference focus detection in the vertical direction (Y direction) in the photographing optical system. FIGS. 10A and 10B correspond to FIGS. 7A and 7B.

In FIG. 10B, similar to FIG. 9B, the slit $OP_{VC}$ of the pixel $S_{VC}$ is projected as a pupil $EP_{VC}$ on the exit pupil TL of the photographing optical system via the microlens 162. Similarly, the slit $OP_{VD}$ of the pixel $S_{VD}$ is projected as a pupil $EP_{VD}$. That is, the exit pupil TL of the photographing optical system is divided into a pair of focus-detecting pupils $EP_{VC}$ and $EP_{VD}$. The pixel $S_{VC}$ receives a light flux having passed through the divided pupil $EP_{VC}$, and the pixel $S_{VD}$ receives a light flux having passed through the divided pupil $EP_{VD}$.

As shown in FIG. 3, the pixels $S_{VC}$ and $S_{VD}$ are regularly arranged in the vertical direction. The defocus amount of an object image can be detected by detecting the image shift amount, that is, phase difference between the third image signal generated by concatenating outputs from a plurality of pixels $S_{VC}$ and the fourth image signal generated by concatenating outputs from a plurality of pixels $S_{VD}$.

Figure 11A:
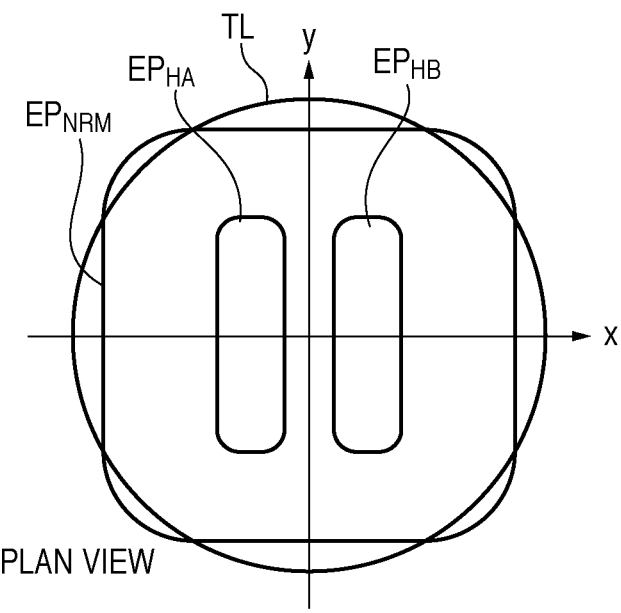
FIG. 11A to FIG. 11C are plan view and graphs, respectively, for explaining the pupil sharpnesses of focus-detecting pixels $S_{HA}$ and $S_{HB}$ and an imaging pixel in the image sensor according to the first embodiment of the present invention.
Figure 11B:
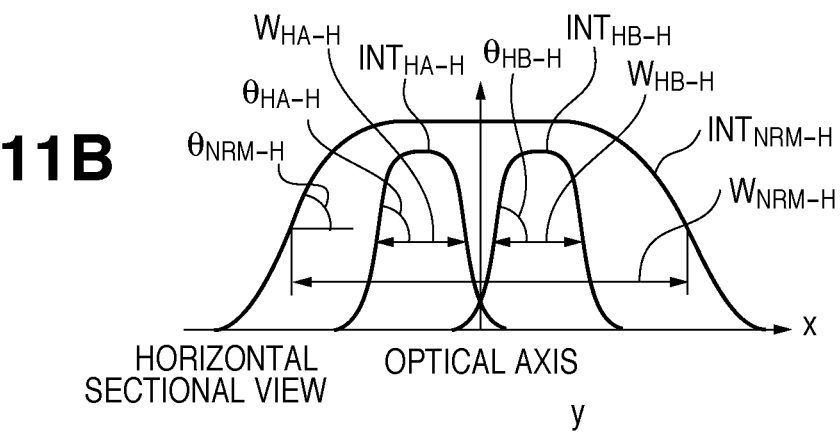
Figure 11C:
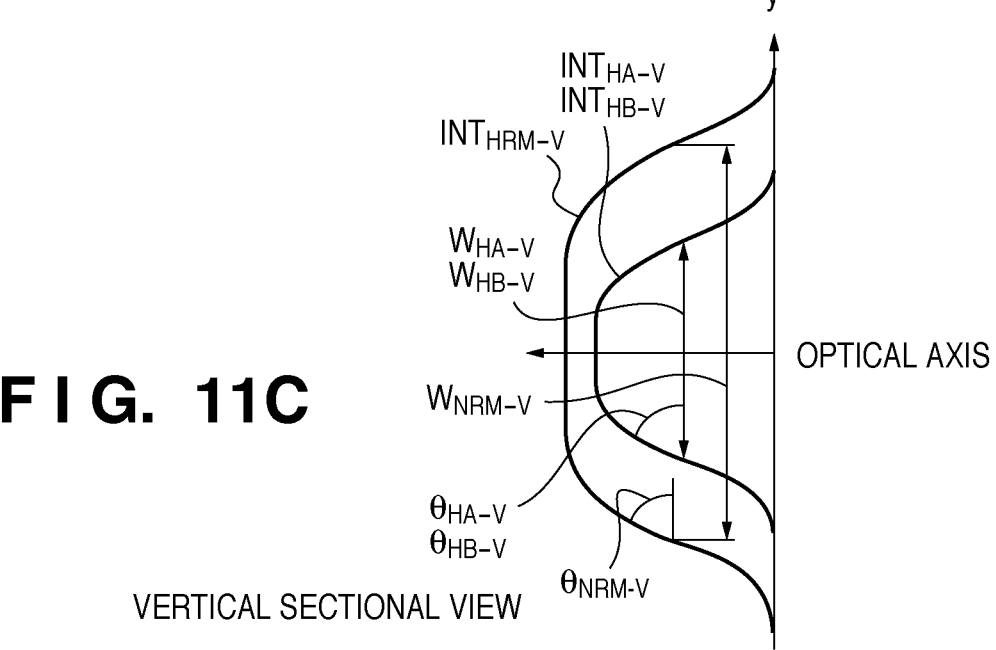

FIG. 11A to FIG. 11C and FIG. 12A to FIG. 12C are views for explaining the sharpness of a pixel pupil projected on the exit pupil TL. FIG. 11A to FIG. 11C are views for explaining the pupil sharpnesses of the focus-detecting pixels $S_{HA}$ and $S_{HB}$ and imaging pixel. FIG. 11A is a plan view of the exit pupil plane of the photographing optical system when viewed from the image sensor. As described above, TL represents the exit pupil of the photographing optical system. $EP_{NRM}$ represents a pupil shape corresponding to an imaging pixel. $EP_{HA}$ and $EP_{HB}$ represent pupil shapes corresponding to the focus-detecting pixels $S_{HA}$ and $S_{HB}$.

The sharpness of a projected pupil decreases owing to diffraction of light within a pixel or aberration of the microlens. A pupil image shown in FIG. 11A is not an ideal sharp image but has a predetermined blur.

FIG. 11B is a graph for explaining the sharpness of each pupil on a section in the horizontal direction (x-axis direction) passing through the optical axis in the plan view shown in FIG. 11A. The abscissa axis represents a horizontal coordinate on the pupil plane of the photographing optical system, and the ordinate axis represents the transmittance of a light flux in each pupil. FIG. 11B shows the angular dependence of the light receiving efficiency of light in each pixel. For descriptive convenience, this graph will be referred to as a "pupil intensity distribution". In FIG. 11B, $INT_{NRM-H}$, $INT_{HA-H}$, and $INT_{HB}$ represent the pupil intensity distributions of the imaging pixel and focus-detecting pixels $S_{HA}$ and $S_{HB}$ on the horizontal section. In each pupil intensity distribution, the width at a ½ intensity of the maximum value is defined as a width W of the pupil intensity distribution. A slope angle θ similarly at the ½ intensity is defined as the sharpness of the pupil intensity distribution. The width W and sharpness θ are discriminated by the suffix, as shown in FIG. 11B.

Similar to FIG. 11B, FIG. 11C is a graph for explaining the sharpness of each pupil on a section in the vertical direction (y-axis direction) passing through the optical axis in the plan view shown in FIG. 11A. $INT_{NRM-V}$, $INT_{HA-V}$, and $INT_{HB-V}$ represent the pupil intensity distributions of the imaging pixel and focus-detecting pixels $S_{HA}$ and $S_{HB}$ on the vertical section. The width W and sharpness θ of the pupil intensity distribution in each pixel are discriminated by the suffix, as shown in FIG. 11C.

The features of the respective pupil intensity distributions in FIGS. 11B and 11C will be explained. In the imaging pixel, as shown in FIG. 5A, the photoelectric conversion unit 152 is covered by neither the first electrode group 154 nor second electrode group 155, and the entire photoelectric conversion unit 152 is exposed. For this reason, the pupil intensity distribution of the imaging pixel is wide, and the horizontal width $W_{NRM-H}$ and vertical width $W_{NRM-V}$ are almost equal to each other. Since the photoelectric conversion efficiency decreases gradually at the periphery of the photoelectric conversion unit 152, the sharpnesses $\theta_{NRM-H}$ and $\theta_{NRM-V}$ of the pupil intensity distributions are low, and the pupil intensity distributions draw gradual bottoms.

In the focus-detecting pixel, as shown in FIG. 11B, the widths $W_{HA-H}$ and $W_{HB-H}$ of the horizontal pupil intensity distribution are small, and the sharpnesses $\theta_{HA-H}$ and $\theta_{HB-H}$ are high. In contrast, as shown in FIG. 11C, the widths $W_{HA-V}$ and $W_{HB-V}$ of the vertical pupil intensity distribution are large, and the sharpnesses $\theta_{HA-V}$ and $\theta_{HB-V}$ are low.

That is, in the focus-detecting pixel, the pupil intensity distribution of each pupil in the pupil-divided direction has high sharpness, and a pair of pupils is definitely divided. In a direction perpendicular to the pupil-divided direction, a wide range of light flux is received to reduce a decrease in the light receiving amount of the focus-detecting pixel.

FIG. 12A to FIG. 12C are views for explaining the pupil sharpnesses of the focus-detecting pixels $S_{VC}$ and $S_{VD}$ and imaging pixel. In FIG. 12A to FIG. 12C, the pupil-divided direction is different by 90° from that in FIG. 11A to FIG. 11C, so the characteristics in FIGS. 12B and 12C are reversed from those in FIGS. 11B and 11C. However, a comparison between characteristics in the pupil-divided direction reveals that these characteristics are almost the same. Also, characteristics in a direction perpendicular to the pupil-divided direction are almost the same.

Figure 13:
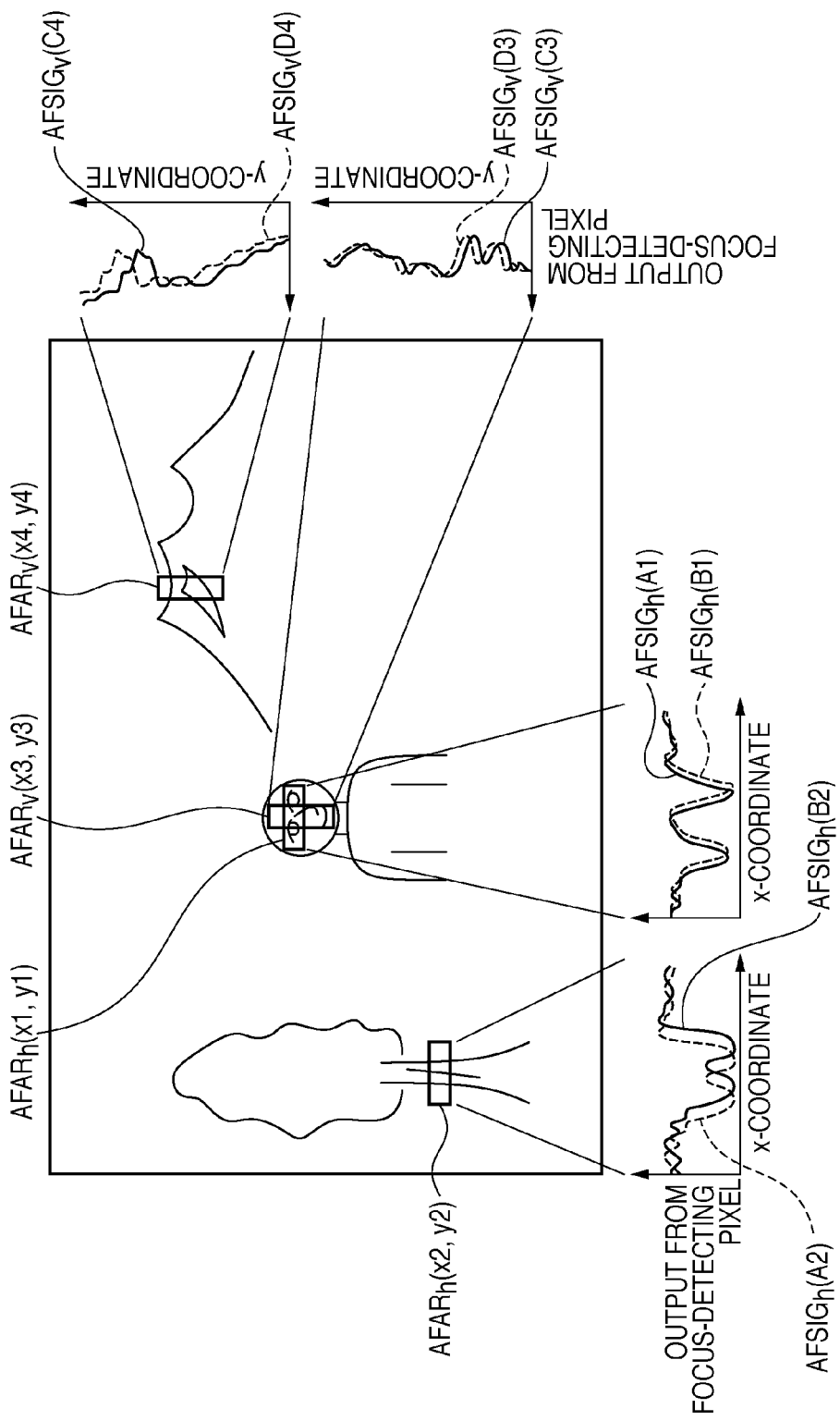
FIG. 13 is a schematic view for explaining an example of an image acquired upon focus detection and a focus detection area in the digital camera according to the first embodiment of the present invention.

FIG. 13 is a schematic view for explaining an example of an image acquired upon focus detection and a focus detection area in the digital camera according to the first embodiment.

In FIG. 13, an object image formed on the imaging surface of the image sensor 107 includes a person at the center, a tree in the foreground on the left side, and mountains in the background on the right side.

The image sensor 107 in the first embodiment has pairs of first focus-detecting pixels $S_{HA}$ and $S_{HB}$ for detecting a horizontal phase difference, and pairs of second focus-detecting pixels $S_{VC}$ and $S_{VD}$ for detecting a vertical phase difference. As shown in FIG. 3, the pairs of first focus-detecting pixels and the pairs of second focus-detecting pixels are arranged distributedly at equal densities in the entire image sensor 107.

When detecting a phase difference, signals from focus-detecting pixels undergo grouping processing, as shown in FIG. 3. Focus detection areas for detecting horizontal and vertical phase differences can be set at arbitrary positions in the imaging area.

In FIG. 13, the person's face exists at the center of the frame. For example, when the image processing circuit 125 detects the presence of a face by applying a known face recognition technique to a shot image, a focus detection area centered on the face area can be set.

More specifically, as shown in FIG. 13, a focus detection area $AFAR_h(x1,y1)$ for horizontal phase-difference focus detection and a focus detection area $AFAR_v(x3,y3)$ for vertical phase-difference focus detection can be set using the face area as a center. The suffix "h" represents the horizontal direction, and (x1,y1) and (x3,y3) indicate the coordinate values of the upper left corners of the focus detection areas. $AFSIG_h(A1)$ represents a phase-difference focus detection A image signal obtained by concatenating, in the horizontal direction, image signals obtained by focus-detecting pixels $S_{HA}$ included in the focus detection area $AFAR_h(x1,y1)$. Similarly, $AFSIG_h(B1)$ represents a phase-difference focus detection B image signal obtained by concatenating, in the horizontal direction, image signals obtained by focus-detecting pixels $S_{HB}$ included in the focus detection area $AFAR_h(x1,y1)$.

The phase difference between the A image signal $AFSIG_h(A1)$ and B image signal $AFSIG_h(B1)$ is calculated by a known correlation calculation, obtaining a horizontal defocus amount.

Also for the focus detection area $AFAR_v(x3,y3)$, a C image signal $AFSIG_v(C3)$ and D image signal $AFSIG_v(D3)$ are obtained from focus-detecting pixels $S_{VC}$ and $S_{VD}$, and a vertical defocus amount is obtained.

The two defocus amounts detected in the two focus detection areas $AFAR_h(x1,y1)$ and $AFAR_v(x3,y3)$ are compared to adopt a value of higher reliability.

The trunk of the tree on the left side of the frame mainly has a vertical line component, that is, a luminance distribution in the horizontal direction. Thus, it is determined that the trunk is an object suitable for horizontal phase-difference focus detection. A focus detection area $AFAR_h(x2,y2)$ for horizontal phase-difference focus detection is set. The ridgeline of the mountains on the right side of the frame mainly has a horizontal line component, that is, a luminance distribution in the vertical direction. Hence, a focus detection area $AFAR_v(x4,y4)$ for vertical phase-difference focus detection is set.

In this fashion, according to the first embodiment, focus detection areas for horizontal phase-difference focus detection and vertical phase-difference focus detection can be set in arbitrary areas of the frame (image sensor). Appropriate focus detection can be executed regardless of the position of an object in the frame or the directional property of the luminance distribution.

Figure 14:
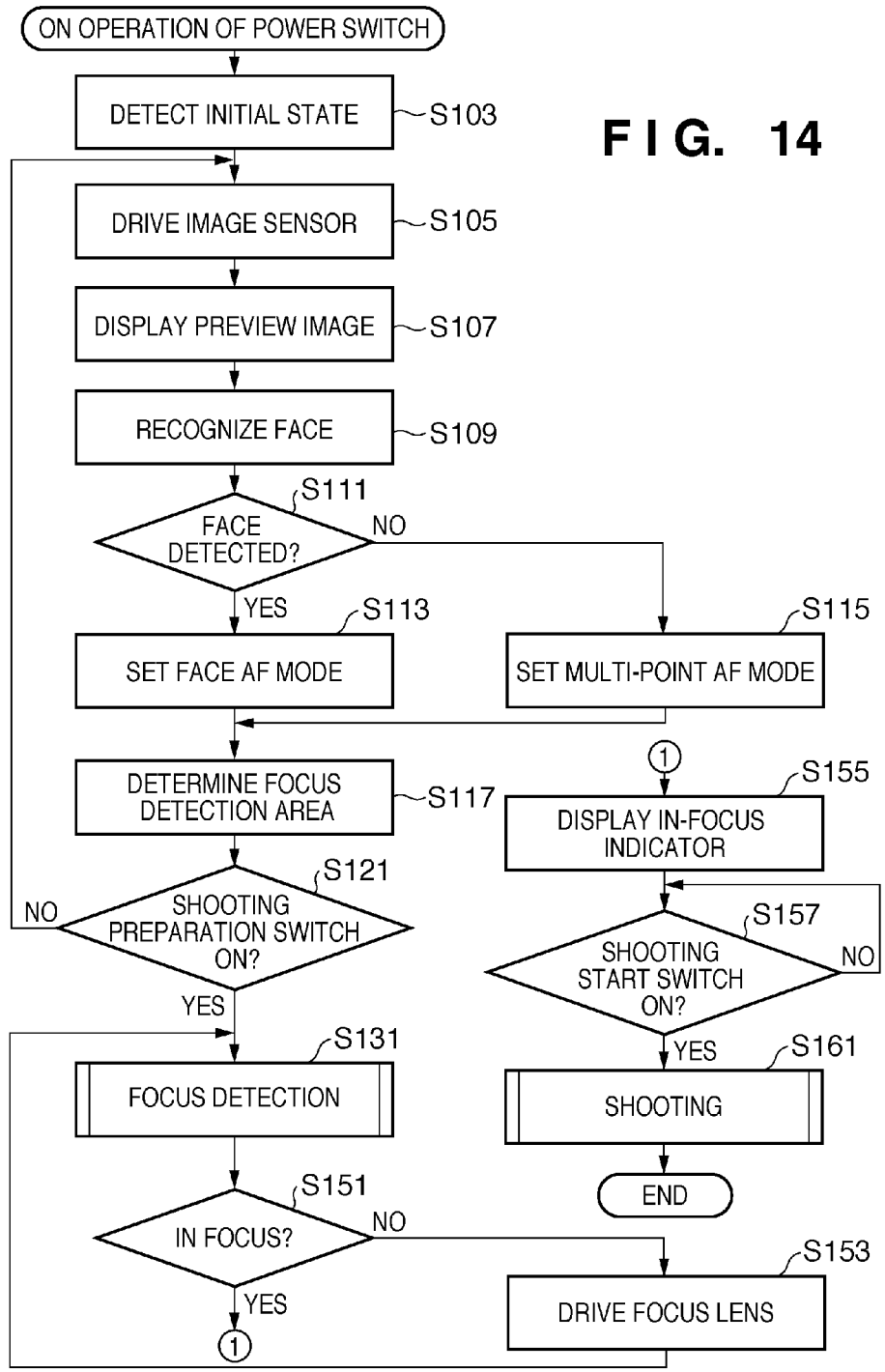
FIG. 14 is a flowchart for explaining the overall operation of the digital camera according to the embodiment.
Figure 15:
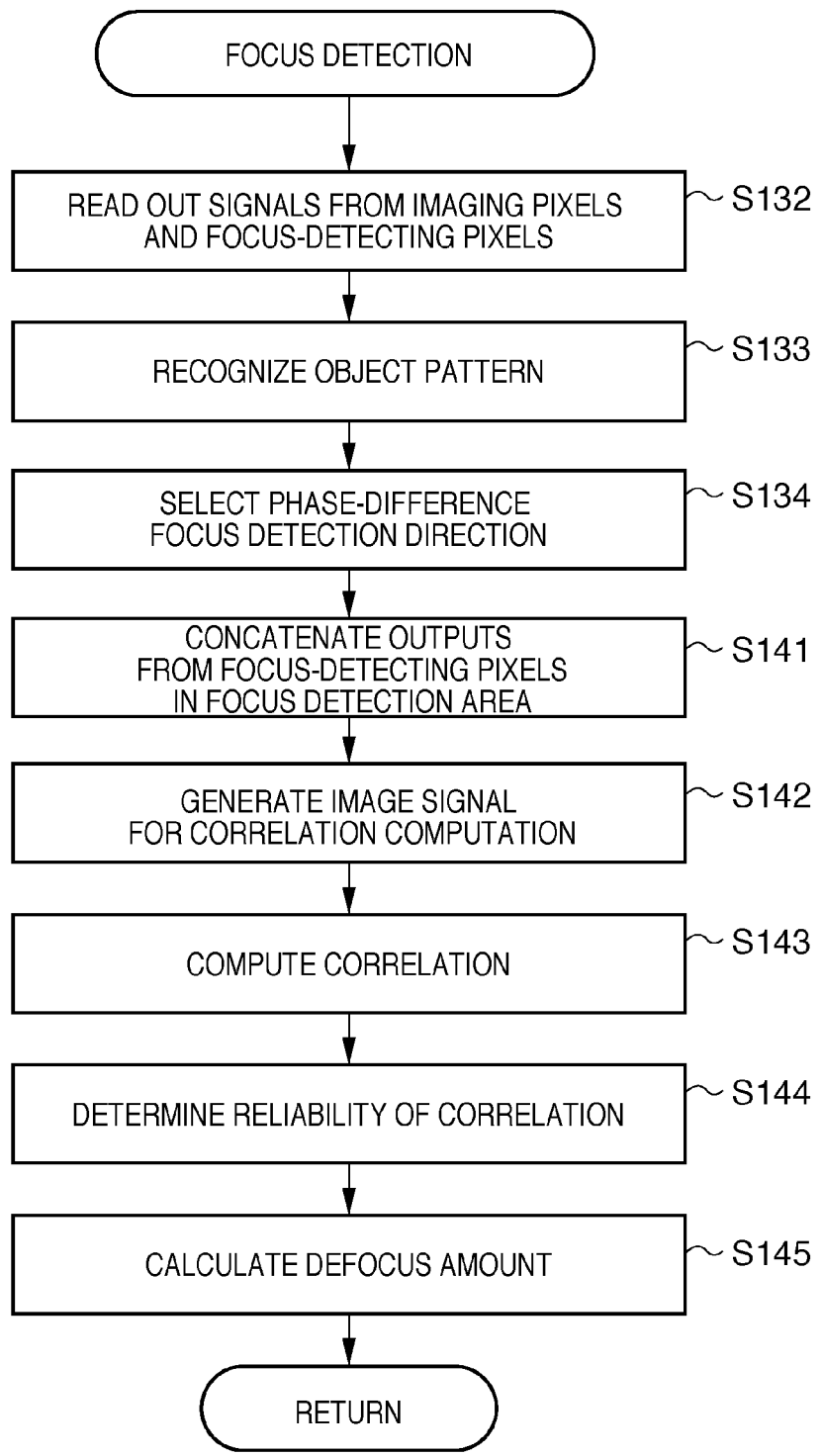
FIG. 15 is a flowchart for explaining details of focus detection processing in S131 of FIG. 14.
Figure 16:
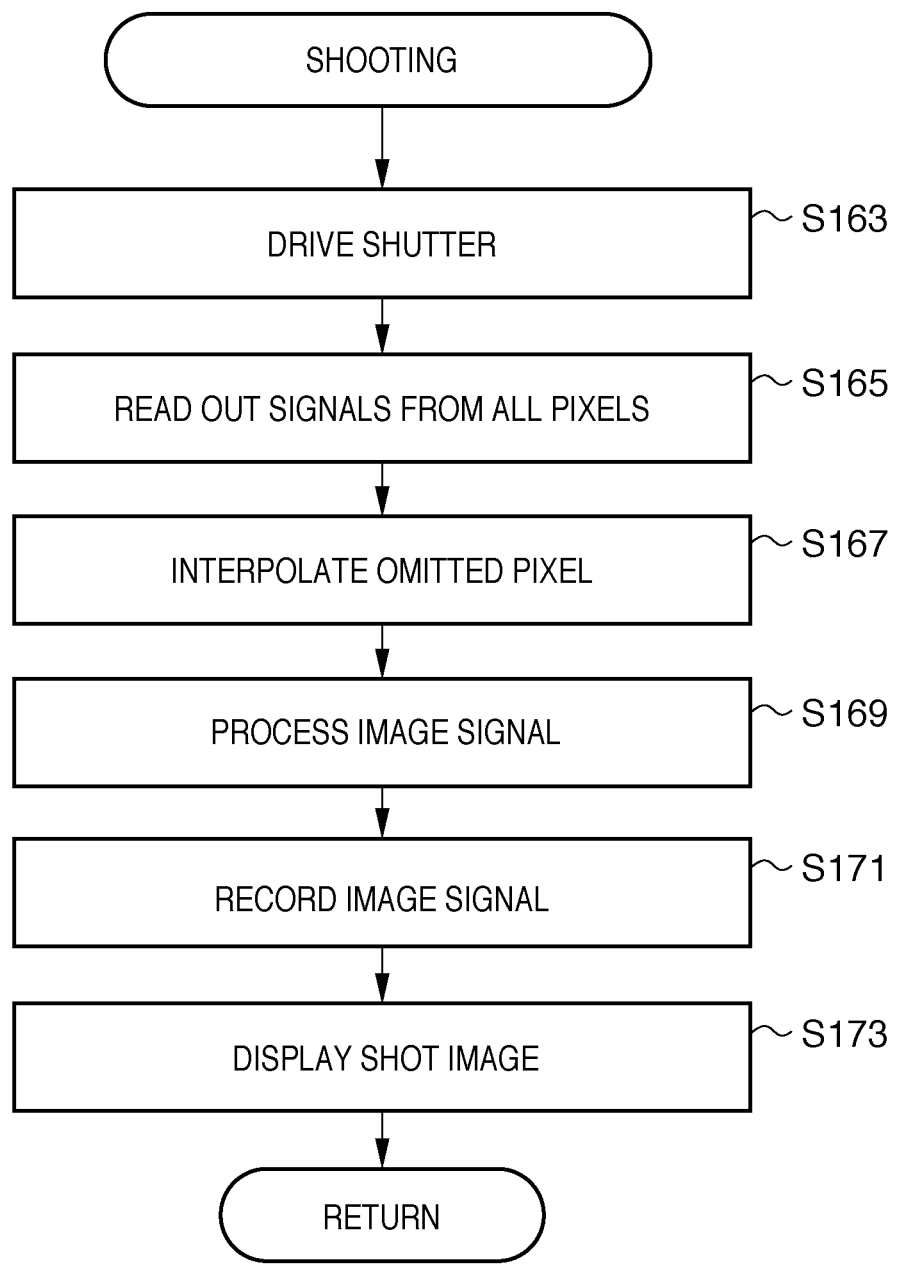
FIG. 16 is a flowchart for explaining details of shooting processing in S161 of FIG. 14.

FIG. 14 to FIG. 16 are flowcharts for explaining the focus adjustment and shooting operations of the digital camera according to the embodiment.

FIG. 14 is a flowchart for explaining the overall operation of the digital camera according to the embodiment.

When the user turns on the power switch among the operation switches 132, the CPU 121 checks the operations of the actuators and image sensor in the camera in S103. The CPU 121 initializes the memory contents and executing programs, and executes a shooting preparation operation.

In S105, the CPU 121 starts the imaging operation of the image sensor 107 via the image sensor driving circuit 124. The image processing circuit 125 processes a shot image, generating a display image (lower in resolution than a recording image). Further, the image processing circuit 125 detects a person's face from the display image.

In S107, the CPU 121 sequentially outputs display images generated by the image processing circuit 125 to the display 131 to cause the display 131 to function as the EVF. While viewing images displayed on the display 131, the user determines the shooting composition.

In S109, the CPU 121 acquires the face detection result, and if a face has been detected, information on the face area from the image processing circuit 125. If a face has been detected, the process shifts from S111 to S113, and the CPU 121 sets the focus adjustment mode to the face AF mode. In the face AF mode, a focus detection area is set in the face area.

If no face has been detected from the display image, the process shifts from S111 to S115, and the CPU 121 sets the focus adjustment mode to the multi-point AF mode. In the multi-point AF mode, the shooting area is divided into a plurality of areas (e.g., 3 (longitudinal)×5 (lateral)=15 areas). Focus detection is executed in each divided area, and a divided area including a principal object analogized from the focus detection result and object luminance information is determined as a final focus detection area.

After determining the AF mode in S113 or S115, the CPU 121 determines a focus detection area in S117. In S121, the CPU 121 determines whether the user has turned on the shooting preparation switch. If the user has not turned on the shooting preparation switch, the process returns to S105, and the CPU 121 repetitively executes the process from driving of the image sensor to determination of the focus detection area in S117.

In S121, the CPU 121 detects the state of the shooting preparation switch among the operation switches 132, and if the user has turned on the shooting preparation switch, the process shifts to S131. If the user has not turned on the shooting preparation switch, the process shifts to S105. The shooting preparation switch may be a switch which is turned on by pressing, for example, the release button halfway.

FIG. 15 is a flowchart for explaining details of focus detection processing in S131.

In S132, the CPU 121 reads out signals from imaging pixels and focus-detecting pixels included in the focus detection area determined in S117. In S133, the CPU 121 recognizes the directional dependence (object pattern) of a change of the object luminance in the focus detection area from the readout imaging pixel information. In S134, the CPU 121 selects a phase-difference focus detection direction suited to focus detection from the object pattern recognized in S133. More specifically, when the luminance of the object image changes in only the horizontal direction, focus detection is done using only focus-detecting pixels for detecting a horizontal phase difference. Similarly, when the luminance of the object image changes in only the vertical direction, focus detection is done using only focus-detecting pixels for detecting a vertical phase difference. When the luminance of the object image changes in both the horizontal and vertical directions, focus detection (cross distance measurement) is performed using focus-detecting pixels for detecting a horizontal phase difference and those for detecting a vertical phase difference.

In S141, the CPU 121 concatenates outputs from focus-detecting pixels in the focus detection area in accordance with pixel positions, obtaining an AF pixel signal. In S142, the CPU 121 executes, for the AF pixel signal obtained in S141, shading correction (light fall-off correction at the periphery of the frame), correction of distortion of two images caused by vignetting, and the like, generating a pair of image signals for correlation computation. More specifically, the CPU 121 generates a pair of image signals such as a pair of A image signal $AFSIG_h(A1)$ and B image signal $AFSIG_h(B1)$, or a pair of C image signal $AFSIG_v(C3)$ and D image signal $AFSIG_v(D3)$ shown in FIG. 13.

In S143, the CPU 121 computes the correlation between the pair of phase-difference focus detection image signals, calculating the phase difference between the image signals.

In S144, the CPU 121 determines the reliability of the computed correlation. The reliability means the coincidence (wavelength similarity) between a pair of image signals, and when the coincidence is high, the reliability of the focus detection result is generally high. When a plurality of focus detection areas are selected, a phase difference based on a pair of higher-reliability image signals is preferentially used.

In S145, the CPU 121 computes a final defocus amount on the basis of the phase difference obtained from the pair of high-reliability image signals. Then, the focus detection processing ends.

Referring back to FIG. 14, in S151, the CPU 121 determines whether the defocus amount calculated in the focus detection processing is equal to or smaller than an allowance (whether the object is in focus). If the defocus amount exceeds the allowance, the CPU 121 determines that the object is out of focus. In S153, the CPU 121 drives the focus lens (third lens group) 105 in a predetermined direction by a predetermined amount via the focus driving circuit 126. The CPU 121 repetitively executes the processes of S131 to S153 until it determines in S151 that the object is in focus.

If the CPU 121 determines in S151 that the object is in focus, it displays an in-focus image on the display 131 in S155, and shifts to S157.

In S157, the CPU 121 determines whether the user has turned on the shooting start switch. If the user has not turned on the shooting start switch, the CPU 121 maintains the shooting standby state in S157. If the CPU 121 determines in S157 that the user has turned on the shooting start switch, the process shifts to S161 to execute shooting processing. The shooting start switch may be a switch which is turned on by pressing, for example, the release button fully.

FIG. 16 is a flowchart for explaining details of the shooting processing in S161.

In S163, the CPU 121 controls the aperture diameter and open/close timing of the shutter 102 via the shutter driving circuit 128, and performs exposure processing. Although not particularly described, as is generally performed, auto exposure control processing is also executed parallel to the focus detection processing to determine an aperture value and shutter speed.

In S165, the CPU 121 reads out an image for generating a recording image, that is, reads out signals from all pixels via the image sensor driving circuit 124.

In S167, the CPU 121 interpolates omitted pixels in the readout image signal using the image processing circuit 125. The omitted pixels include a defective pixel generated in manufacturing the image sensor 107, and a focus-detecting pixel. As described above, the focus-detecting pixel does not have an RGB color filter, and can receive light from only part of the exit pupil. Thus, an image signal is generated by interpolation using information of peripheral imaging pixels, similar to a general defective pixel.

In S169, the CPU 121 causes the image processing circuit 125 to perform so-called developing processes such as color interpolation, image γ correction, and edge emphasis, and image processes such as encoding in accordance with settings.

In S171, the CPU 121 records a shot image on the recording medium 133.

In S173, the CPU 121 displays the shot image on the display 131. Then, the shooting processing ends.

As described above, according to the first embodiment, electrode groups originally included in the image sensor are used as a member (light shielding film) that limits a light flux in the pupil-divided direction. No dedicated light shielding film need be arranged, and the degree at which the structure of the image sensor is complicated can be suppressed.

Since electrode groups are positioned near the focus of the microlens, the pupil intensity distribution in the pupil-divided direction becomes sharp. As a result, the pupil division performance is improved, and degradation of the phase-difference focus detection image signal is suppressed, obtaining high focus detection precision.

Positioning electrode groups near the focus of the microlens increases the distance between the microlens and the member which limits a light flux in the pupil-divided direction. This can reduce a positional error of the pupil intensity distribution arising from the alignment error between the microlens and the member which limits a light flux. Hence, even if focus-detecting pupils are eclipsed by the photographing lens, the eclipse amount becomes almost equal between the pair of pupils, and the light quantity is hardly unbalanced. A decrease in focus detection precision can be suppressed.

[Second Embodiment]

In the first embodiment, a member which limits a light flux in the pupil-divided direction in a focus-detecting pixel is formed using the first electrode group 154 closer to the focus position of the microlens 162 out of the first and second electrode groups 154 and 155 having different distances from the focus position of the microlens 162. A member which limits a light flux in a direction perpendicular to the pupil-divided direction in a focus-detecting pixel is formed using the second electrode group 155 farther from the focus position of the microlens 162 than the first electrode group 154.

To the contrary, in the second embodiment, members which limit light fluxes in the pupil-divided direction and a direction perpendicular to it are formed by the first electrode group 154 without using the second electrode group 155.

Figure 17:
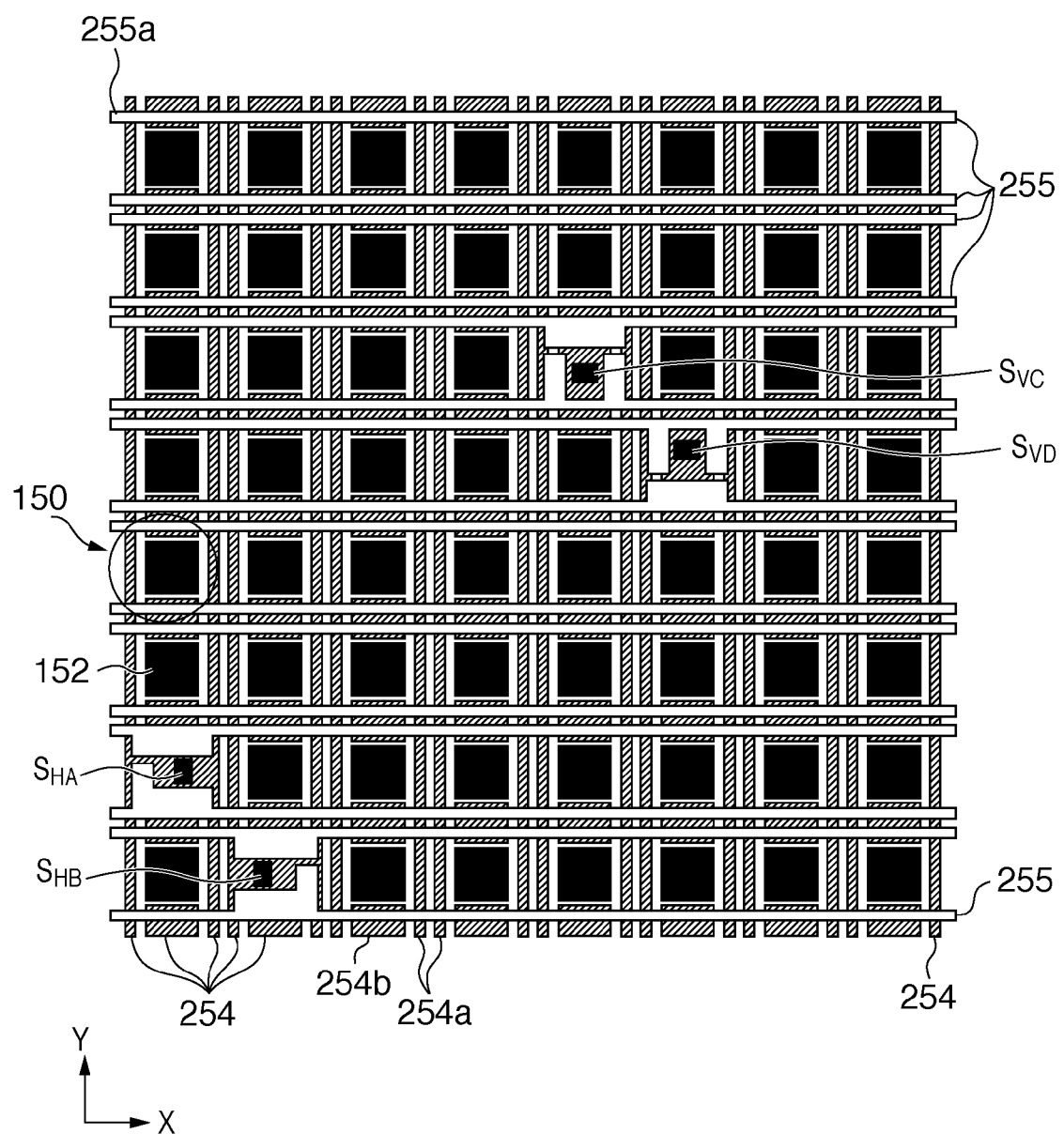
FIG. 17 is an enlarged plan view of 8×8=64 pixels included in a unit block in an image sensor which forms a focus detection device according to the second embodiment, when viewed from the photographing optical system.

FIG. 17 is an enlarged plan view of 8×8=64 pixels included in a unit block in an image sensor which forms a focus detection device according to the second embodiment, when viewed from the photographing optical system.

Photoelectric conversion units 152 represented by black rectangles are arranged on the lowermost layers of pixels, and have almost the square shape in all pixels. As will be described later, pixels 150 in which the entire photoelectric conversion units 152 are exposed are imaging pixels. Pixels $S_{HA}$, $S_{HB}$, $S_{VC}$, and $S_{VD}$ in which the photoelectric conversion units 152 are partially exposed are focus-detecting pixels. Outputs from the photoelectric conversion units 152 are read out via first and second electrode groups 254 and 255. The image sensor according to the first embodiment and that according to the second embodiment are different in only the shapes of the first and second electrode groups. The shapes of the remaining members are the same, and only the difference will be explained.

The first electrode group 254 arranged above (on the light incident side) the photoelectric conversion unit 152 elongates in the Y direction (upward in FIG. 17). The first electrode group 254 includes linear-shaped, a primary electrode group for signal transmission 254a arranged regularly in the X direction (right in FIG. 17), and island-shaped, interconnecting electrodes group 254b arranged in respective pixels. The second electrode group 255 arranged above the first electrode group 254 elongates in the X direction. The second electrode group 255 includes linear electrode 255a arranged regularly in the Y direction. Signal charges generated in the photoelectric conversion unit 152 are output to a subsequent circuit via a floating diffusion (not shown), the first electrode group 254, and the second electrode group 255.

The shapes of the first and second electrode groups 254 and 255 are the same as those of the first and second electrode groups 154 and 155 in the first embodiment at a portion corresponding to the periphery of the imaging pixel. However, the shapes of the first and second electrode groups 254 and 255 at portions corresponding to the peripheries of the focus-detecting pixels $S_{HA}$, $S_{HB}$, $S_{VC}$, and $S_{VD}$ are different as follows from those in the first embodiment.

FIGS. 18A and 18B are views for explaining the structure of a focus-detecting pixel (for horizontal phase-difference focus detection) in an image sensor 107 according to the second embodiment. FIGS. 18A and 18B correspond to FIGS. 6A and 6B in the first embodiment. FIG. 18A is an enlarged plan view of four pixels, that is, the focus-detecting pixels $S_{HA}$ and $S_{HB}$ and two imaging pixels 150 in FIG. 17. FIG. 18B is a sectional view of the focus-detecting pixels $S_{HA}$ and $S_{HB}$ taken along the line A-A in FIG. 18A.

Also in the second embodiment, the focus-detecting pixels $S_{HA}$ and $S_{HB}$ have pupil-dividing slits $OP_{HA}$ and $OP_{HB}$. However, the first electrode group 254 defines all the sides of each slit. The first electrode group 254 runs in the Y direction. The photoelectric conversion unit 152 of the focus-detecting pixel includes an area (exposed portion) not shielded from light by the first electrode group 254. When a light flux having passed through the exposed portion present near the photoelectric conversion unit 152 reaches the photoelectric conversion unit 152 upon diffraction, a second peak appears, which is undesirable to the pupil intensity distribution of the focus-detecting pixel. To suppress a light flux entering the photoelectric conversion unit from the exposed portion, the second embodiment widens part of the second electrode group 255 to form projecting portions $255_H$ and $255_S$ extended to shield the exposed portion from light. This structure can effectively decrease unwanted light entering the focus-detecting pixel from a portion other than the slit.

As described above, according to the second embodiment, the slit of the focus-detecting pixel is formed using only the first electrode group arranged near the focus position of the microlens out of the electrode groups of the image sensor. Further, an area not shielded from light by the first electrode group is shielded from light using the second electrode group arranged farther from the focus position of the microlens than the first electrode group. This structure limits a light flux entering the photoelectric conversion unit of the focus-detecting pixel from a portion other than the slit.

FIGS. 19A and 19B are views for explaining the structure of a focus-detecting pixel (for vertical phase-difference focus detection) in the image sensor 107 according to the second embodiment. FIGS. 19A and 19B correspond to FIGS. 7A and 7B in the first embodiment. FIG. 19A is an enlarged plan view of four pixels, that is, the focus-detecting pixels $S_{VC}$ and $S_{VD}$ and two imaging pixels 150 in FIG. 17. FIG. 19B is a sectional view of the focus-detecting pixels $S_{VC}$ and $S_{VD}$ taken along the line A-A in FIG. 19A. The structure of a pupil-dividing slit in a focus-detecting pixel for vertical phase-difference focus detection will be executed with reference to FIG. 19A.

In the focus-detecting pixels $S_{VC}$ and $S_{VD}$ for vertical phase-difference focus detection, the first and second electrode groups 254 and 255 run in the same directions as those in the focus-detecting pixels $S_{HA}$ and $S_{HB}$ for horizontal phase-difference focus detection shown in FIGS. 18A and 18B. However, the pupil-divided directions are different by 90°. Thus, the shapes of electrodes for forming pupil-dividing slits change as follows.

In the focus-detecting pixel for horizontal phase-difference focus detection shown in FIG. 18A, the width of linear-shaped, the primary electrode group for signal transmission 254a running in the Y direction in the first electrode group 254 is extended to cover the photoelectric conversion unit 152. A slit is formed in the extended portion. To the contrary, in the focus-detecting pixel for vertical phase-difference focus detection, the photoelectric conversion unit 152 is covered by a portion of island-shaped, the interconnecting electrode group 254b in the first electrode group 254 that is extended in the Y direction, and a slit $OP_{VD}$ or $OP_{VC}$ is formed in the extended portion, as shown in FIG. 19A. Further, projecting portions $255_V$ and $255_S$ of the second electrode group 255 are formed to cover exposed portions present between linear-shaped, the primary electrode group for signal transmission 254a running in the Y direction and island-shaped, the interconnecting electrodes group 254b in the first electrode group 254. The projecting portions $255_V$ and $255_S$ reduce the exposed portion which allows a light flux to enter the photoelectric conversion unit 152. This structure effectively prevents unwanted light undesirable to pupil division from reaching the photoelectric conversion unit 152 via the exposed portion.

FIG. 20A to FIG. 20C and FIG. 21A to FIG. 21C are views for explaining the pupil sharpness of each pixel in the second embodiment. FIG. 20A to FIG. 20C and FIG. 21A to FIG. 21C correspond to FIG. 11A to FIG. 11C and FIG. 12A to FIG. 12C in the first embodiment. FIG. 20A to FIG. 20C are views for explaining the pupil sharpnesses of the focus-detecting pixels $S_{HA}$ and $S_{HB}$ and imaging pixel shown in FIGS. 18A and 18B.

In focus-detecting pixels according to the second embodiment, both slits which limit light fluxes in the pupil-divided direction and a direction perpendicular to it are formed by the first electrode group. That is, the slits are formed by electrodes equidistant from the focus position of a microlens 162. For this reason, the sharpnesses $\theta_{HA-H}$ and $\theta_{HB-H}$ of pupil intensity distributions on the horizontal section in FIG. 20B equal the sharpnesses $\theta_{HA-V}$ and $\theta_{HB-V}$ of pupil intensity distributions on the vertical section in FIG. 20C. However, the width W of the pupil intensity distribution is small in the horizontal direction which is the pupil-divided direction (FIG. 20B), and large in the vertical direction (FIG. 20C), similar to the first embodiment. For this reason, the second embodiment also implements definite pupil division and reduces a decrease in light receiving amount.

Pupil intensity distributions $INT_{HA-X}$ and $INT_{HB-X}$ represented by broken lines in FIG. 20B are second peaks which appear owing to leakage light reaching the photoelectric conversion unit 152 via the exposed portion in a case wherein neither the projecting portion $255_H$ nor $255_S$ of the second electrode group 255 in FIG. 18A is formed. The second peak generated by leakage light degrades the pupil division performance when a photographing optical system using a small F-number, that is, a bright photographing optical system is used. As a result, the correlation between the defocus amount and the phase difference between a pair of image signals for phase-difference focus detection becomes irregular, making accurate focus detection difficult. In the second embodiment, as shown in FIG. 18A, unwanted light is blocked by forming the second electrode group 255 to have the projecting portions $255_H$ and $255_S$. Generation of the second peaks $INT_{HA-X}$ and $INT_{HB-X}$ by leakage light can be suppressed, reducing degradation of the pupil division characteristic.

FIG. 21A to FIG. 21C are views for explaining the pupil sharpnesses of the focus-detecting pixels $S_{VC}$ and $S_{VD}$ and imaging pixel. In FIG. 21A to FIG. 21C, the pupil-divided direction is different by 90° from that in FIG. 20A to FIG. 20C, so the characteristics in FIGS. 21B and 21C are reversed from those in FIGS. 20B and 20C. However, a comparison between characteristics in the pupil-divided direction reveals that these characteristics are almost the same. Also, characteristics in a direction perpendicular to the pupil-divided direction are almost the same.

A selected focus detection area and phase-difference focus detection image in the second embodiment are the same as those shown in FIG. 13. Operations regarding focus detection and shooting are the same as those described with reference to FIG. 14 to FIG. 16, and a description thereof will not be repeated.

As described above, according to the second embodiment, in addition to the effects of the first embodiment, a pupil-dividing opening is formed by an electrode group arranged near the focus position of the microlens. The pupil intensity distributions in the pupil-divided direction and a direction perpendicular to it become sharp.

An electrode group different from one which forms a pupil-dividing opening prevents light entering the exposed portion from reaching the photoelectric conversion unit, thereby further improving the pupil division characteristic. As a result, degradation of a phase-difference focus detection image signal can be suppressed to increase the focus detection precision.

The distance between the microlens and all members which form openings for limiting a light flux in the pupil-divided direction is large. This can further reduce a positional error of the pupil intensity distribution arising from the alignment error between the microlens and the member which limits a light flux. Even if focus-detecting pupils are eclipsed by the photographing lens, the eclipse amount becomes almost equal between the pair of pupils, and the light quantity is hardly unbalanced. A decrease in focus detection precision can be further suppressed.

In the above-described embodiments, the focus detection device according to the present invention is applied to a digital still camera. However, the present invention is widely available for image sensors, represented by a CMOS image sensor, in which a layer of a substance capable of light shielding is formed between a photoelectric conversion unit and a microlens. Hence, the present invention is applicable to an arbitrary apparatus capable of using such an image sensor. For example, the present invention can be applied to an arbitrary apparatus having the function of the digital camera, such as a camcorder (movie camera) for recording a moving image, various inspection cameras, a monitoring camera, an endoscope camera, or a robot camera.

An arrangement other than an image sensor having focus-detecting pixels is not indispensable for the present invention. Known arbitrary arrangements are available as an arrangement for generating a pair of image signals for phase-difference focus detection from outputs from focus-detecting pixels, and an arrangement for obtaining a defocus amount from a pair of image signals for phase-difference focus detection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-061845, filed on Mar. 11, 2008, and No. 2009-049716, filed on Mar. 3, 2009, which are hereby incorporated by reference herein in their entirety.

The invention claimed is:

1. A focus detection device, in which a plurality of pixels are arranged, each pixel having a photoelectric conversion unit for converting an incident light flux into signal charges and a microlens having a focus position near the photoelectric conversion unit, comprising:

signal lines which are used to read out signals converted from the signal charges, wherein the plurality of pixels include a plurality of imaging pixels for generating an image, and a plurality of focus-detecting pixels for generating an image signal for focus detection by a phase-difference focus detection method, wherein the signal lines comprise first signal lines and second signal lines, the first signal lines being arranged to limit incident light flux for the plurality of focus-detecting pixels in a first direction that is a predetermined pupil-divided direction, and the second signal lines being arranged to extend in a second direction that is perpendicular to the first direction, wherein a width of an opening, which is formed between the first signal lines, in the first direction is narrower than a width of an opening that limits incident light flux for an imaging pixel in the first direction, and wherein a distance between the first signal lines and the photoelectric conversion unit is shorter than a distance between the second signal lines and the photoelectric conversion unit.

2. The focus detection device according to claim 1, wherein the opening is formed by extending widths of at least one of the first signal lines and the second signal lines that are arranged around the focus-detecting pixels toward centers of the photoelectric conversion units of the plurality of focus-detecting pixels.

3. The focus detection device according to claim 2, wherein the signal lines have a multilayered structure, the opening has a shape with sides perpendicular to the first direction defined by the first signal lines, and sides parallel to the first direction defined by the second signal lines, and the first signal lines which define at least the sides of the opening that are perpendicular to the first direction are signal lines in a layer other than a layer farthest from the focus position of the microlens among the signal lines.

4. The focus detection device according to claim 3, wherein the first signal lines which define the sides of the opening that are perpendicular to the first direction are signal lines in a layer other than the layer farthest from the focus position of the microlens among the signal lines, and the second signal lines which define the sides of the opening that are parallel to the first direction are signal lines in the layer farther from the focus position of the microlens among the signal lines than the first signal lines which define the sides of the opening that are perpendicular to the first direction.

5. The focus detection device according to claim 3, wherein neither the first signal lines which define the sides of the opening that are perpendicular to the first direction, nor the second signal lines which define the sides of the opening that are parallel to the first direction are signal lines in the layer farthest from the focus position of the microlens among the signal lines, and of the signal lines arranged around the focus-detecting pixel, signal lines in a layer farther from the focus position of the microlens than the signal lines which define the sides of the opening are formed to shield, from light, an area of the photoelectric conversion unit of a focus-detecting pixel that is not shielded from light by the signal lines which define the sides of the opening.

6. The focus detection device according to claim 1, wherein the plurality of focus-detecting pixels are arranged at equal densities, and include a first pair of focus-detecting pixels and a second pair of focus-detecting pixels of which the first directions are perpendicular to each other.

7. The focus detection device according to claim 1, further comprising:

a generation unit adapted to generate a pair of image signals for detecting a phase difference in the pupil-divided direction on the basis of signal charges read out from the plurality of focus-detecting pixels; and a calculation unit adapted to calculate a defocus amount from the pair of image signals generated by the generation unit.

8. An imaging apparatus comprising:

a photographing optical system having a focus lens;

a focus detection device defined in claim 7;

a driving unit adapted to drive the focus lens in accordance with a defocus amount calculated by the calculation unit of the focus detection device; and an image processing unit adapted to generate an image on the basis of signal charges read out from the plurality of imaging pixels of the focus detection device.

9. The focus detection device according to claim 1, wherein the signal lines are made of an aluminum metal film or a copper metal film.

10. The focus detection device according to claim 1, wherein the signal lines are formed by etching an aluminum metal film or a copper metal film.

11. A focus detection device, in which a plurality of pixels are arranged, each pixel having a microlens, and a photoelectric conversion portion for converting an incident light flux into signal charges, comprising:

signal lines which are used to read out signals converted from the signal charges, wherein the plurality of pixels include a plurality of imaging pixels for generating an image, and a plurality of focus-detecting pixels for generating an image signal for focus detection by a phase-difference focus detection method, wherein the signal lines comprise first signal lines and second signal lines, the first signal lines being arranged to limit incident light flux for the focus-detecting pixels in a first direction that is a phase-difference focus detection direction, and the second signal lines being arranged to extend in a second direction that is perpendicular to the first direction, wherein a width of a space for the plurality of focus-detecting pixels, which is formed between the first signal lines, in the first direction is narrower than a width of a space for the plurality of imaging pixels, which is formed between the first signal lines, in the first direction, and wherein the first signal lines are closer to the photoelectric conversion portion than the second signal lines.

12. The focus detection device according to claim 11, wherein the space is formed by extending widths of at least one of the first signal lines and the second signal lines that are arranged around the focus-detecting pixels toward centers of photoelectric conversion portions of the plurality of focus-detecting pixels.

13. The focus detection device according to claim 12, wherein the signal lines have a multilayered structure, the space has a shape with sides perpendicular to the first direction defined by the first signal lines, and sides parallel to the first direction defined by the second signal lines, and the first signal lines which define at least the sides of the space that are perpendicular to the first direction are signal lines in a layer other than a layer farthest from a focus position of the microlens among the signal lines.

14. The focus detection device according to claim 13, wherein the first signal lines which define the sides of the space that are perpendicular to the first direction are signal lines in a layer other than the layer farthest from the focus position of the microlens among the signal lines, and the second signal lines which define the sides of the space that are parallel to the first direction are signal lines in the layer farther from the focus position of the microlens among the signal lines than the first signal lines which define the sides of the space that are perpendicular to the first direction.

15. The focus detection device according to claim 13, wherein neither the first signal lines which define the sides of the space that are perpendicular to the first direction, nor the second signal lines which define the sides of the space that are parallel to the first direction are signal lines in the layer farthest from the focus position of the microlens among the signal lines, and of the signal lines arranged around the focus-detecting pixel, signal lines in a layer farther from the focus position of the microlens than the signal lines which define the sides of the space are formed to shield, from light, an area of a photoelectric conversion portion of a focus-detecting pixel that is not shielded from light by the signal lines which define the sides of the space.

16. The focus detection device according to claim 11, wherein the plurality of focus-detecting pixels are arranged at equal densities, and include a first pair of focus-detecting pixels and a second pair of focus-detecting pixels of which the first directions are perpendicular to each other.

17. The focus detection device according to claim 11, further comprising:

a generation unit adapted to generate a pair of image signals for detecting a phase difference in the pupil-divided direction on the basis of signal charges read out from the plurality of focus-detecting pixels; and a calculation unit adapted to calculate a defocus amount from the pair of image signals generated by the generation unit.

18. An imaging apparatus comprising:

a photographing optical system having a focus lens;

a focus detection device defined in claim 17;

a driving unit adapted to drive the focus lens in accordance with a defocus amount calculated by the calculation unit of the focus detection device; and an image processing unit adapted to generate an image on the basis of signal charges read out from the plurality of imaging pixels of the focus detection device.

19. The focus detection device according to claim 11, wherein the signal lines are made of an aluminum metal film or a copper metal film.

20. The focus detection device according to claim 11, wherein the signal lines are formed by etching an aluminum metal film or a copper metal film.

* * * * *